US012580916B2

(12) United States Patent
Sadhwani et al.

(10) Patent No.: US 12,580,916 B2
(45) Date of Patent: Mar. 17, 2026

(54) SELECTIVE ACCESS TO INFORMATION DURING VALIDATION OPERATIONS

(71) Applicant: Boost SubscriberCo L.L.C., Englewood, CO (US)

(72) Inventors: Sandeep N. Sadhwani, Dallas, TX (US); Bart Becnel, Highlands Ranch, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 49 days.

(21) Appl. No.: 18/747,326

(22) Filed: Jun. 18, 2024

(65) Prior Publication Data

US 2025/0385914 A1    Dec. 18, 2025

(51) Int. Cl.
H04L 9/40        (2022.01)
H04L 41/14       (2022.01)
H04L 67/30       (2022.01)

(52) U.S. Cl.
CPC ............ H04L 63/10 (2013.01); H04L 41/145 (2013.01); H04L 67/30 (2013.01)

(58) Field of Classification Search
CPC ........ H04L 63/10; H04L 41/145; H04L 67/30
See application file for complete search history.

(56) References Cited

U.S. PATENT DOCUMENTS

2024/0039807 A1* 2/2024 Yue ....................... H04L 41/145

OTHER PUBLICATIONS

Sandeep N. Sadhwani, Dynamic Generation of Information Requests, U.S. Appl. No. 18/747,291, filed Jun. 18, 2024, p. 1-80.
Sandeep N. Sadhwani, Dynamic Analysis of Responses to Information Requests, U.S. Appl. No. 18/747,302, filed Jun. 18, 2024, p. 1-70.
Sandeep N. Sadhwani, Dynamic Implementation of an Architecture Roadmap, U.S. Appl. No. 18/747,318, filed Jun. 18, 2024, p. 1-80.

* cited by examiner

*Primary Examiner* — Ryan J Jakovac
(74) *Attorney, Agent, or Firm* — Baker Botts L.L.P.

(57)        ABSTRACT

An apparatus comprises a memory and a processor communicatively coupled to one another. The processor is configured to, in response to receiving an architecture roadmap comprising one or more operational tasks, execute the machine learning algorithm to evaluate the operational tasks associated with the architecture roadmap, determine one or more reviewing guidelines based on the operational tasks, determine a reviewing entity profile of the one or more reviewing entity profiles comprising a reviewing parameter that at least partially match a reviewing guideline of the reviewing guidelines, determine a reviewing entity associated with the reviewing entity profile, and assign the operational tasks to the reviewing entity. The processor is configured generate one or more access commands configured to facilitate access to a one or more resources and transmit the access commands to the reviewing entity. The resources allow the operational tasks to be evaluated by the reviewing entity.

20 Claims, 9 Drawing Sheets

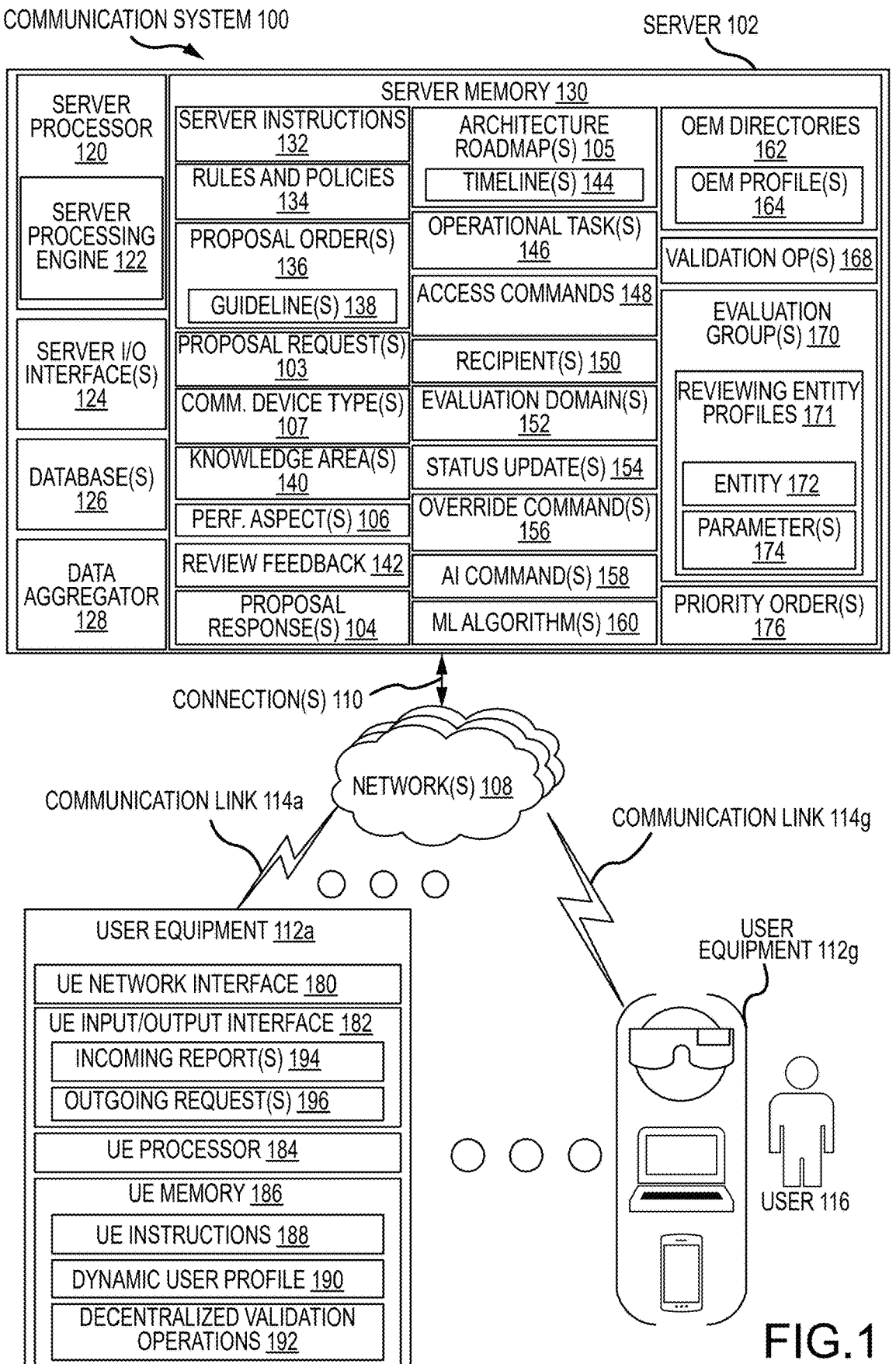

COMMUNICATION SYSTEM 100

SERVER 102

SERVER MEMORY 130

SERVER PROCESSOR 120

SERVER PROCESSING ENGINE 122

SERVER I/O INTERFACE(S) 124

DATABASE(S) 126

DATA AGGREGATOR 128

SERVER INSTRUCTIONS 132

RULES AND POLICIES 134

PROPOSAL ORDER(S) 136

GUIDELINE(S) 138

PROPOSAL REQUEST(S) 103

COMM. DEVICE TYPE(S) 107

KNOWLEDGE AREA(S) 140

PERF. ASPECT(S) 106

REVIEW FEEDBACK 142

PROPOSAL RESPONSE(S) 104

ARCHITECTURE ROADMAP(S) 105

TIMELINE(S) 144

OPERATIONAL TASK(S) 146

ACCESS COMMANDS 148

RECIPIENT(S) 150

EVALUATION DOMAIN(S) 152

STATUS UPDATE(S) 154

OVERRIDE COMMAND(S) 156

AI COMMAND(S) 158

ML ALGORITHM(S) 160

OEM DIRECTORIES 162

OEM PROFILE(S) 164

VALIDATION OP(S) 168

EVALUATION GROUP(S) 170

REVIEWING ENTITY PROFILES 171

ENTITY 172

PARAMETER(S) 174

PRIORITY ORDER(S) 176

CONNECTION(S) 110

NETWORK(S) 108

COMMUNICATION LINK 114a

COMMUNICATION LINK 114g

USER EQUIPMENT 112a

UE NETWORK INTERFACE 180

UE INPUT/OUTPUT INTERFACE 182

INCOMING REPORT(S) 194

OUTGOING REQUEST(S) 196

UE PROCESSOR 184

UE MEMORY 186

UE INSTRUCTIONS 188

DYNAMIC USER PROFILE 190

DECENTRALIZED VALIDATION OPERATIONS 192

USER EQUIPMENT 112g

USER 116

FIG.1

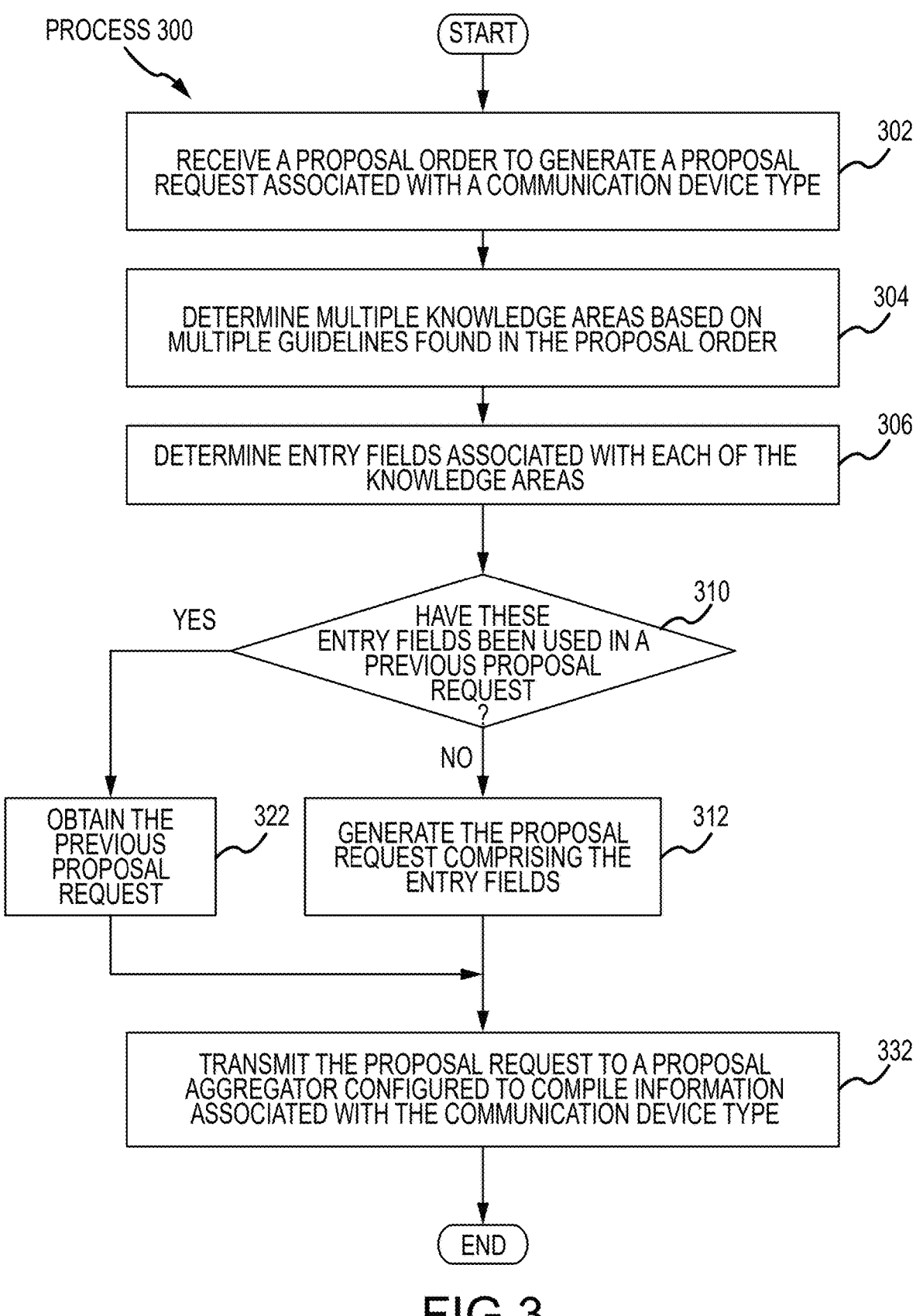

PROCESS 300

START

302
RECEIVE A PROPOSAL ORDER TO GENERATE A PROPOSAL REQUEST ASSOCIATED WITH A COMMUNICATION DEVICE TYPE

304
DETERMINE MULTIPLE KNOWLEDGE AREAS BASED ON MULTIPLE GUIDELINES FOUND IN THE PROPOSAL ORDER

306
DETERMINE ENTRY FIELDS ASSOCIATED WITH EACH OF THE KNOWLEDGE AREAS

310
HAVE THESE ENTRY FIELDS BEEN USED IN A PREVIOUS PROPOSAL REQUEST ?

YES

NO

322
OBTAIN THE PREVIOUS PROPOSAL REQUEST

312
GENERATE THE PROPOSAL REQUEST COMPRISING THE ENTRY FIELDS

332
TRANSMIT THE PROPOSAL REQUEST TO A PROPOSAL AGGREGATOR CONFIGURED TO COMPILE INFORMATION ASSOCIATED WITH THE COMMUNICATION DEVICE TYPE

END

FIG.3

PROCESS 500

PROCESS 700

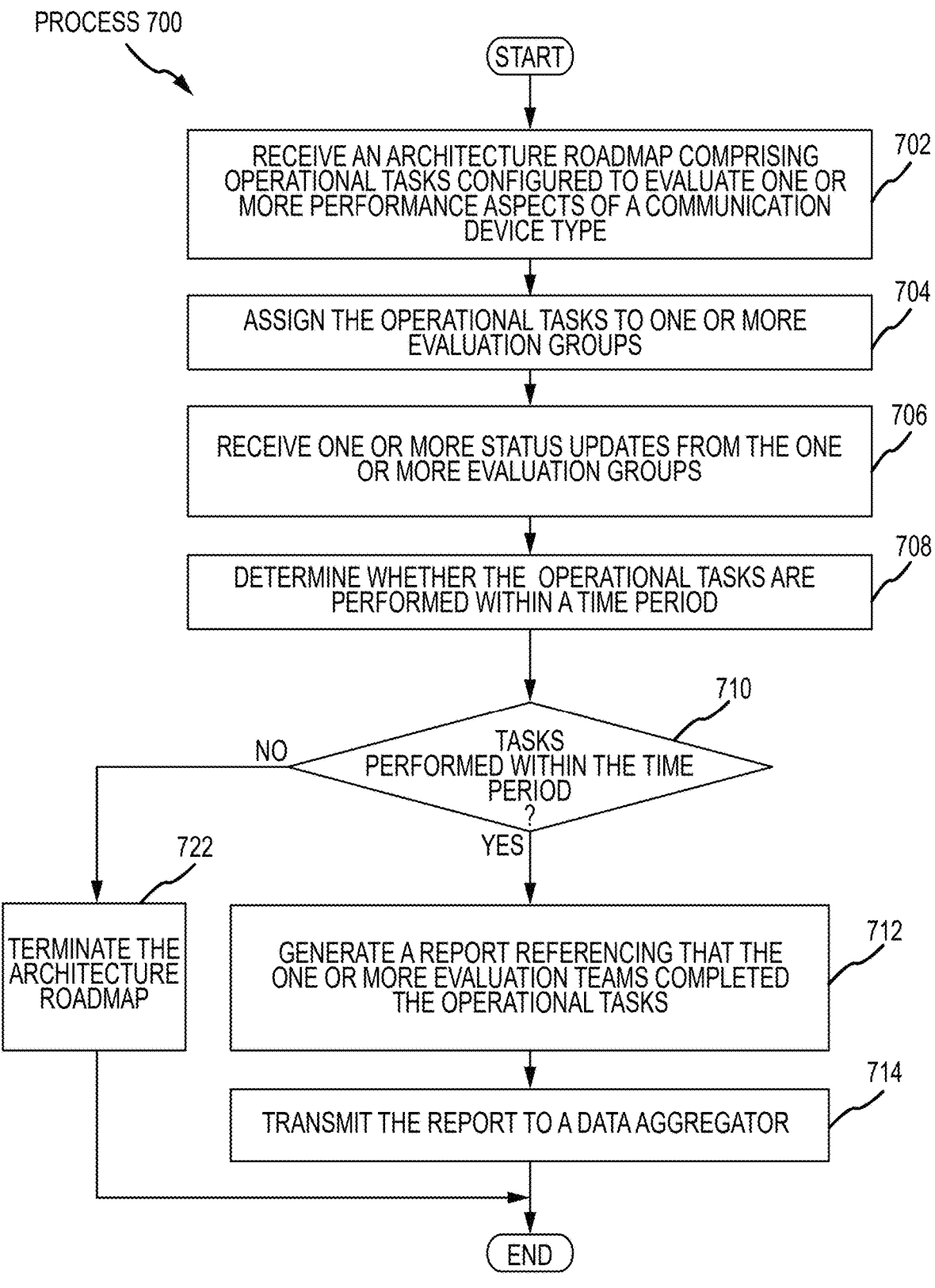

START

RECEIVE AN ARCHITECTURE ROADMAP COMPRISING
OPERATIONAL TASKS CONFIGURED TO EVALUATE ONE OR
MORE PERFORMANCE ASPECTS OF A COMMUNICATION
DEVICE TYPE
702

ASSIGN THE OPERATIONAL TASKS TO ONE OR MORE
EVALUATION GROUPS
704

RECEIVE ONE OR MORE STATUS UPDATES FROM THE ONE
OR MORE EVALUATION GROUPS
706

DETERMINE WHETHER THE OPERATIONAL TASKS ARE
PERFORMED WITHIN A TIME PERIOD
708

TASKS
PERFORMED WITHIN THE TIME
PERIOD
?
710

NO

YES

TERMINATE THE
ARCHITECTURE
ROADMAP
722

GENERATE A REPORT REFERENCING THAT THE
ONE OR MORE EVALUATION TEAMS COMPLETED
THE OPERATIONAL TASKS
712

TRANSMIT THE REPORT TO A DATA AGGREGATOR
714

END

FIG.7

SELECTIVE ACCESS TO INFORMATION DURING VALIDATION OPERATIONS

TECHNICAL FIELD

The present disclosure relates generally to validation operations performed in a communication system, and more specifically to a system and method configured to selectively access information during validation operations.

BACKGROUND

Certain user devices may not be compatible with hardware requirements or software requirements of a specific communication network. These user devices may not be configured to perform operations at a predefined standard of the specific communication network. In this regard, the lack of compatibility between the user devices and the communication network may cause certain communication operations to fail (e.g., be dropped). In particular, communication operations may be lost in cases where the specific communication network demands integration of one or more technologies in the configuration of the user devices. Further, these dropped communication operations may cause interruptions in service operations and/or communication operations exchanged between the user devices.

SUMMARY OF THE DISCLOSURE

In one or more embodiments, systems and methods disclosed herein perform selective access to information during validation operations. The information may be data and/or commands configured to form a basis to perform one or more tests of aspects and/or capabilities relating to one or more communication devices. These communication devices may comprise hardware and software that, when executed by hardware, cause the communication devices to transmit and/or receive data in a communication network. For the communication devices to be able to transmit and/or receive data in the communication network, capabilities of the communication devices may need to be approved before these communication devices perform any operations in the communication network. In this regard, the communication devices may be approved or disapproved before joining and/or connecting for the first time with the communication network. To determine whether the communication devices are approved or disapproved, the systems may be configured to evaluate multiple aspects of the communication devices. The capabilities and/or aspects may comprise one or more hardware capabilities and/or software capabilities of one or more specific communication devices and/or one or more communication device types.

The validation operations may comprise one or more operational tasks configured to evaluate one or more aspects of specific communication devices. Each operational task may comprise one or more analyses performed by at least one reviewing entity. The reviewing entities may comprise devices and/or components configured to perform the one or more analyses. In this regard, the systems may be configured to selectively provide access to information that is specific to one or more specific operational tasks associated with a given reviewing entity.

In one or more embodiments, the systems may be configured to use artificial intelligence (AI) commands optimized by one or more machine learning (ML) algorithms to provide access to certain information during validation operations. The systems may execute the ML algorithms to dynamically select and provide access to operational tasks for a specific reviewing entity. Different reviewing entities associated with a given communication network may be associated with different ranks and access to network resources based on corresponding roles in the communication network and/or subject-matter expertise. In this regard, the systems may be configured to dynamically assign operational tasks generated by the ML algorithms to specific reviewing entities in accordance with one or more conditions. These conditions may include availability of a given reviewing entity, length of a role associated with a given reviewing entity, rank in a given evaluation group, expertise in a subject matter associated with a given reviewing entity, and historical feedback received from reviewing entities among others. The operational tasks may not be assigned to reviewing entities and/or evaluation groups that are not available to perform tasks. Further, specific operational tasks may be performed by a managing reviewing entity configured to review preliminary review feedback from other reviewing entities. Upon assignment, the ML algorithm may provide access to resources relevant to performing the assigned operational task. These resources may be network resources associated with a technical approval process.

In one or more embodiments, the systems and methods described herein are integrated into a practical application of filtering network resources available to a given reviewing entity during validation operations. The systems are configured to evaluate reviewing parameters associated with a given reviewing entity, assign operational tasks to the reviewing entity based on the reviewing parameters, determine network resources to enable completion of operational tasks assigned to the reviewing entity, and selectively provide access between the network resources and the reviewing entity. regarding some embodiments, the systems are configured to assign operational tasks to be performed by reviewing entities that are previously determined to be capable to perform the operational tasks. The systems may be configured to determine capabilities of one or more evaluation groups and/or one or more reviewing entities in a given evaluation group. Herein, the ML algorithm is executed to assign the operational tasks to reviewing entities and/or evaluation groups in accordance with the capabilities determined by the system.

In addition, the system and method described herein provide the technical advantage of increasing processing speeds in a computer system, because processors associated with the systems and methods prevent or eliminate waste of network resources when assigning operational tasks to reviewing entities. In particular, the systems and methods reduce memory usage and increase processing speed by selectively filtering access to network resources every instance in which the operational tasks are assigned based on one or more capabilities of a reviewing entity. The network resources may be processing resources, memory resources, and/or memory resources configured to enable the reviewing entity to perform the operational tasks. The systems may assign the operational tasks to the reviewing entity in accordance with a plan set out in a given architecture roadmap as determined by the ML algorithm. Herein, a specific reviewing entity may be enabled to access information determined in accordance with an ML model to be relevant to perform one or more specific operational tasks. For example, a first reviewing entity that is assigned operational tasks that evaluate a performance aspect of a memory in a cellular device may be provided with access to datasheets and configuration commands of the memory. In this example, a second reviewing entity that is assigned operational tasks that evaluate a performance aspect of antennas in the cellular device may be provided with access to datasheets and configuration commands of the antennas while being prevented from accessing memory-specific information.

In one or more embodiments, the systems and methods may be performed by an apparatus, such as a server, communicatively coupled to multiple network components in a core network, one or more base stations in a radio access network, and one or more user equipment. Further, the systems may comprise a wireless communication system, which comprises the apparatus. In addition, the systems and methods may be performed as part of a process performed by the apparatus communicatively coupled to the network components in the core network. As a non-limiting example, the apparatus may comprise a memory and a processor communicatively coupled to one another. The memory may be operable to store a machine learning algorithm configured to analyze and structure data in accordance with one or more machine learning model and one or more reviewing entity profiles. Each reviewing entity profile of the one or more reviewing entity profiles may be associated with one or more reviewing parameters. The processor may be configured to receive an architecture roadmap comprising one or more operational tasks configured to evaluate a performance aspect of a communication device type. The architecture roadmap may be a plan to perform the operational tasks over a time period. Further, the processor may be configured to, in response to receiving the architecture roadmap comprising the operational tasks, execute the machine learning algorithm to evaluate the operational tasks associated with the architecture roadmap in accordance with the one or more machine learning models, determine one or more reviewing guidelines based on the operational tasks and the communication device type in response to evaluating the operational tasks, determine a reviewing entity profile of the one or more reviewing entity profiles comprising a reviewing parameter that at least partially match a reviewing guideline of the reviewing guidelines, determine a reviewing entity associated with the reviewing entity profile, and assign the operational tasks to the reviewing entity. Each of the reviewing guidelines may comprise instructions for performing one or more of the operational tasks configured to evaluate the performance aspect of the communication device type. The reviewing entity may be configured to perform the operational tasks over the time period. The processor may be configured generate one or more access commands configured to facilitate access to a one or more resources and transmit the access commands to the reviewing entity. The resources may allow the operational tasks to be evaluated by the reviewing entity.

Certain embodiments of this disclosure may comprise some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 1 illustrates an example communication system, in accordance with one or more embodiments;

FIG. 3 illustrates an example flowchart of a method to perform the operational flow of FIG. 2, in accordance with one or more embodiments;

FIG. 7 illustrates an example flowchart of a method to perform the operational flow of FIG. 6, in accordance with one or more embodiments;

DETAILED DESCRIPTION

Figure 2:
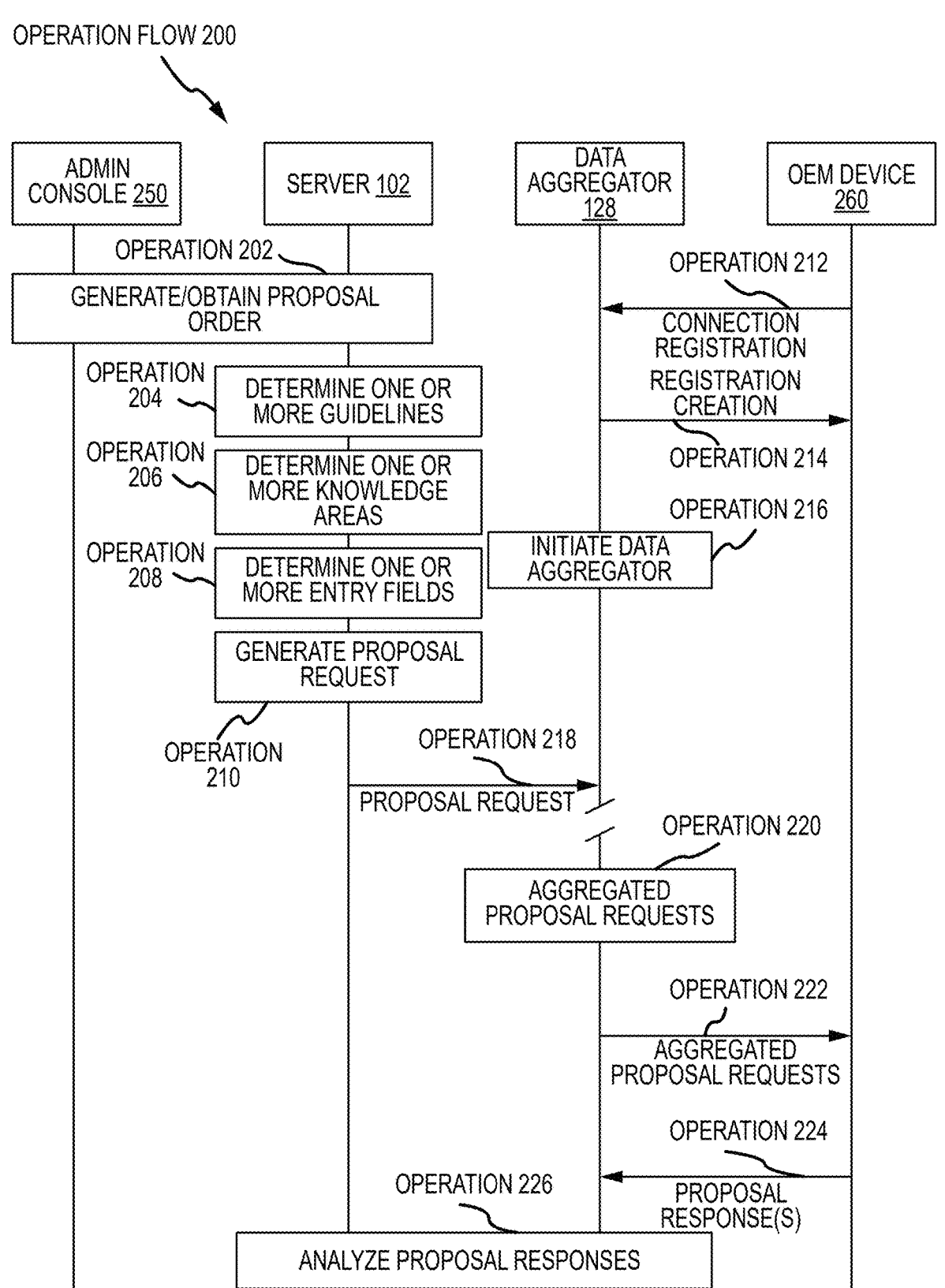
FIG. 2 illustrates an operation flow to perform dynamic generation of information requests, in accordance with one or more embodiments.
Figure 4:
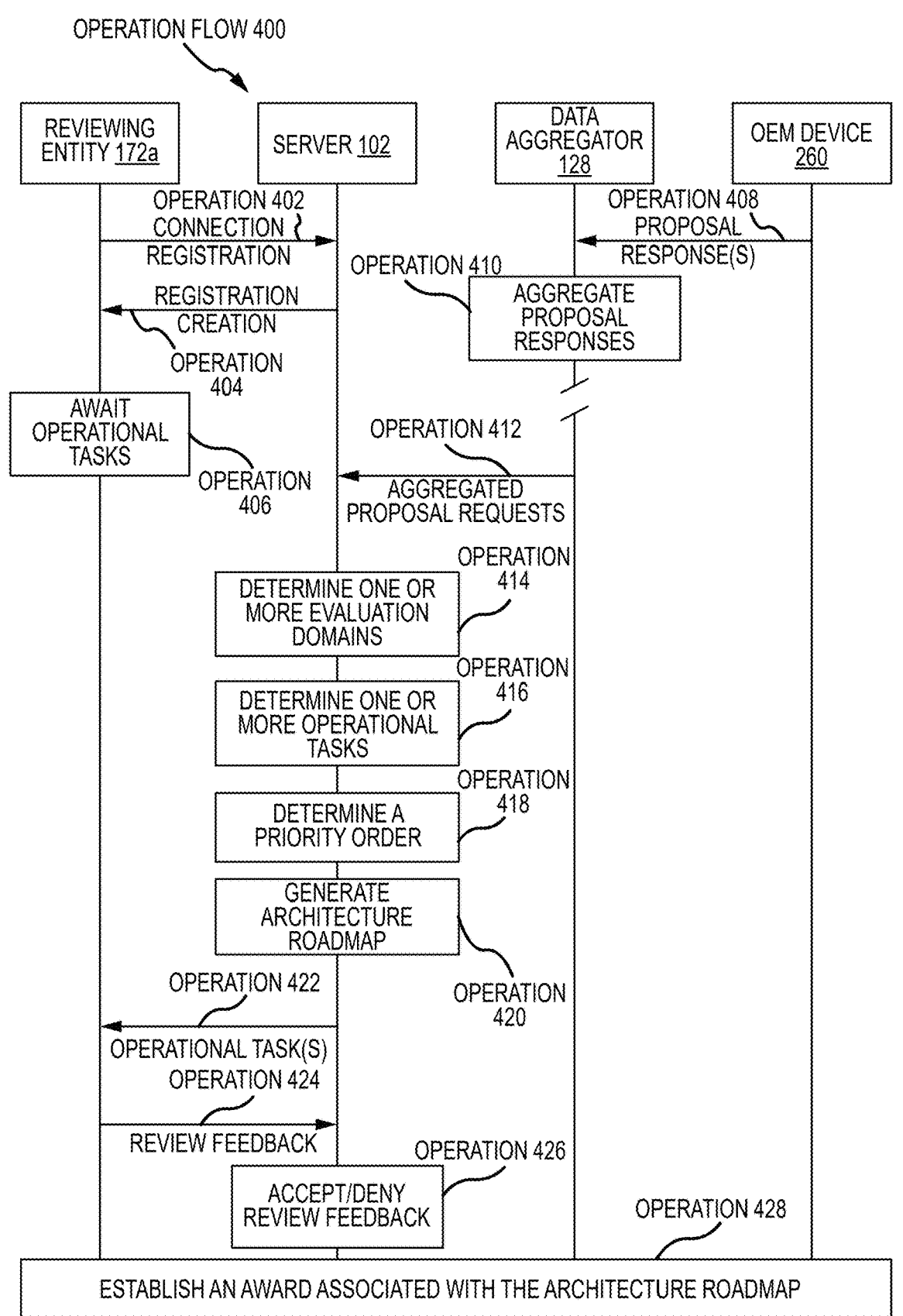
FIG. 4 illustrates an operation flow to perform dynamic analysis of responses to information requests, in accordance with one or more embodiments.
Figure 5:
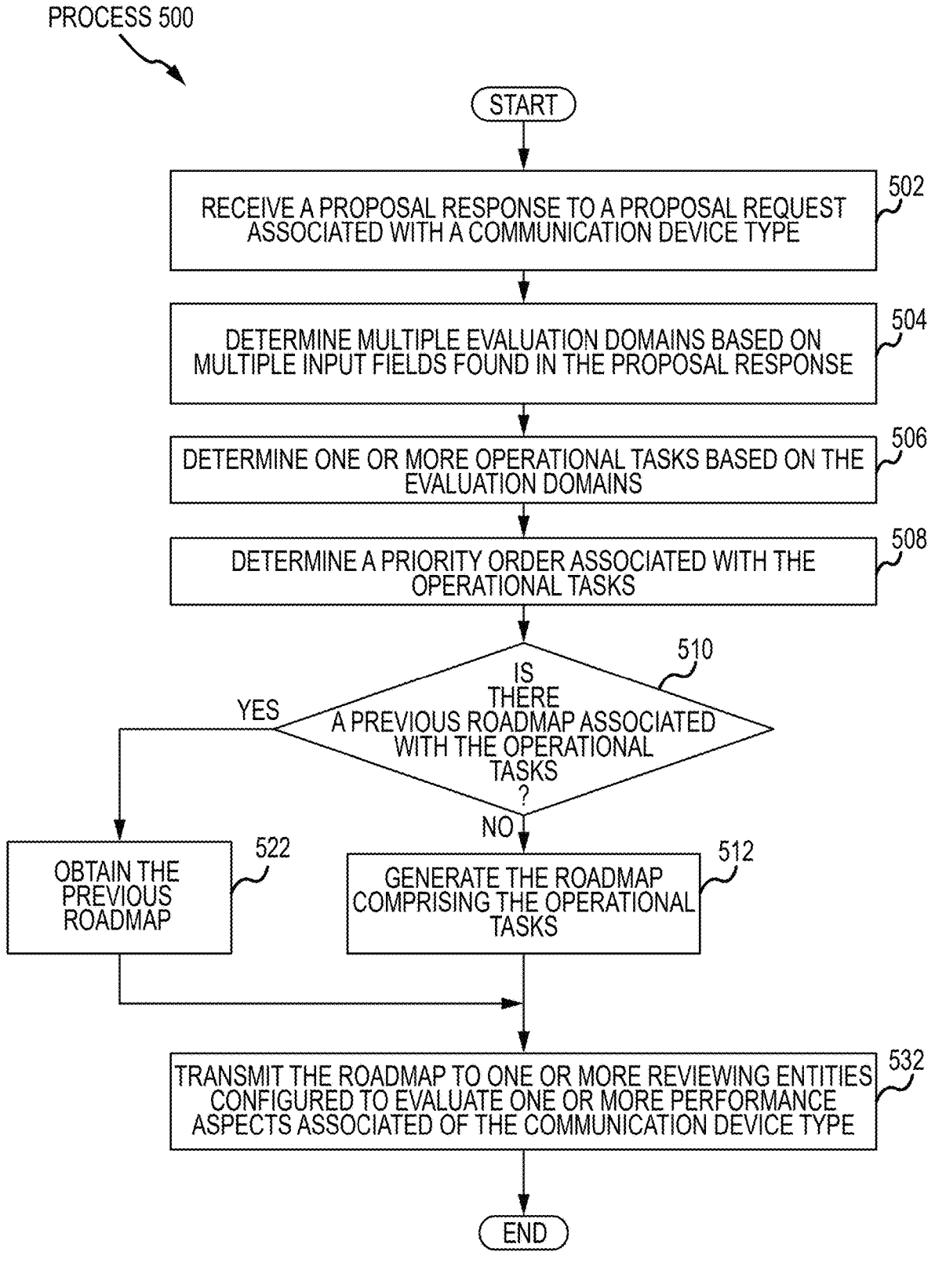
FIG. 5 illustrates an example flowchart of a method to perform the operational flow of FIG. 4, in accordance with one or more embodiments.
Figure 6:
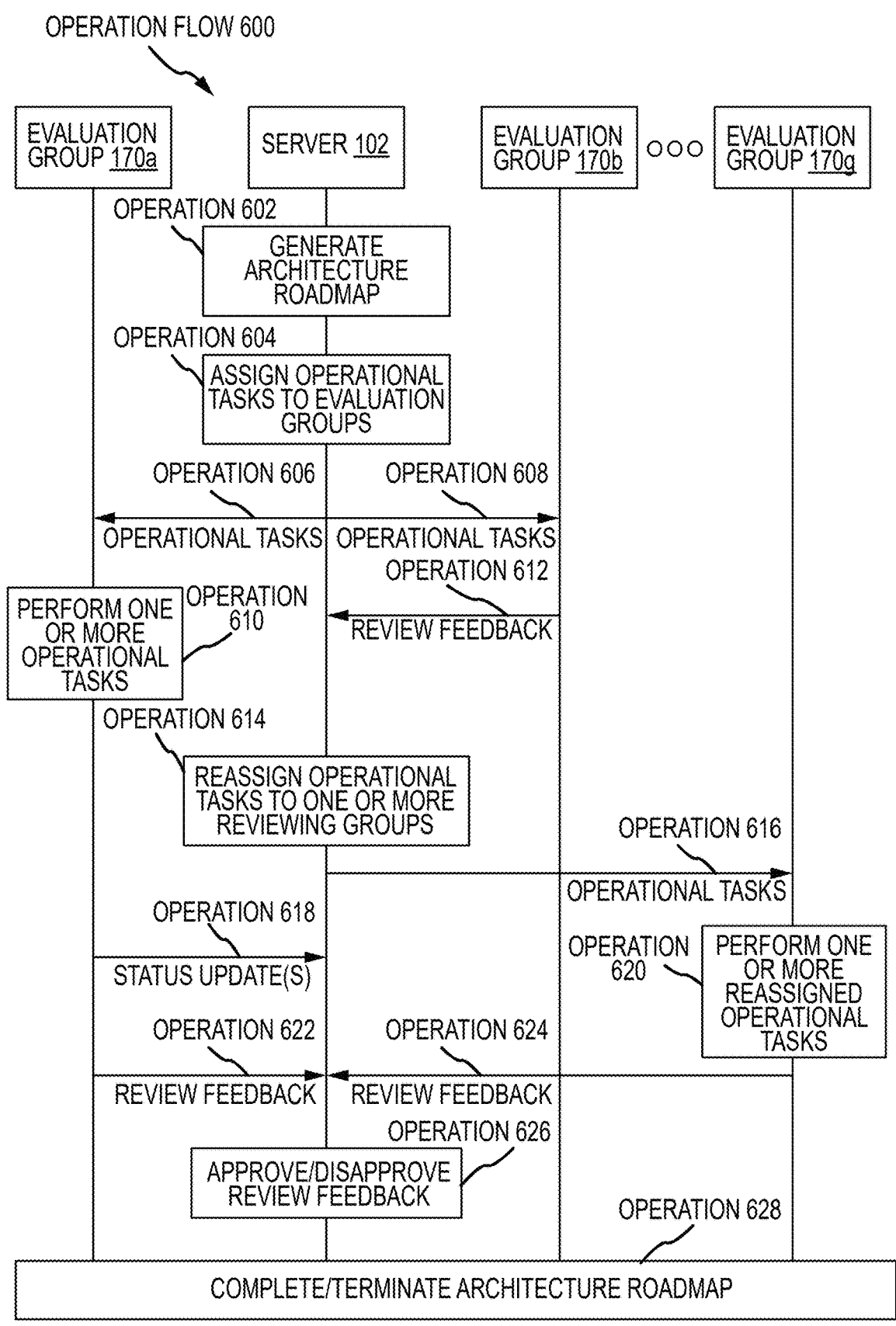
FIG. 6 illustrates an operation flow to perform dynamic implementation of an architecture roadmap, in accordance with one or more embodiments.
Figure 8:
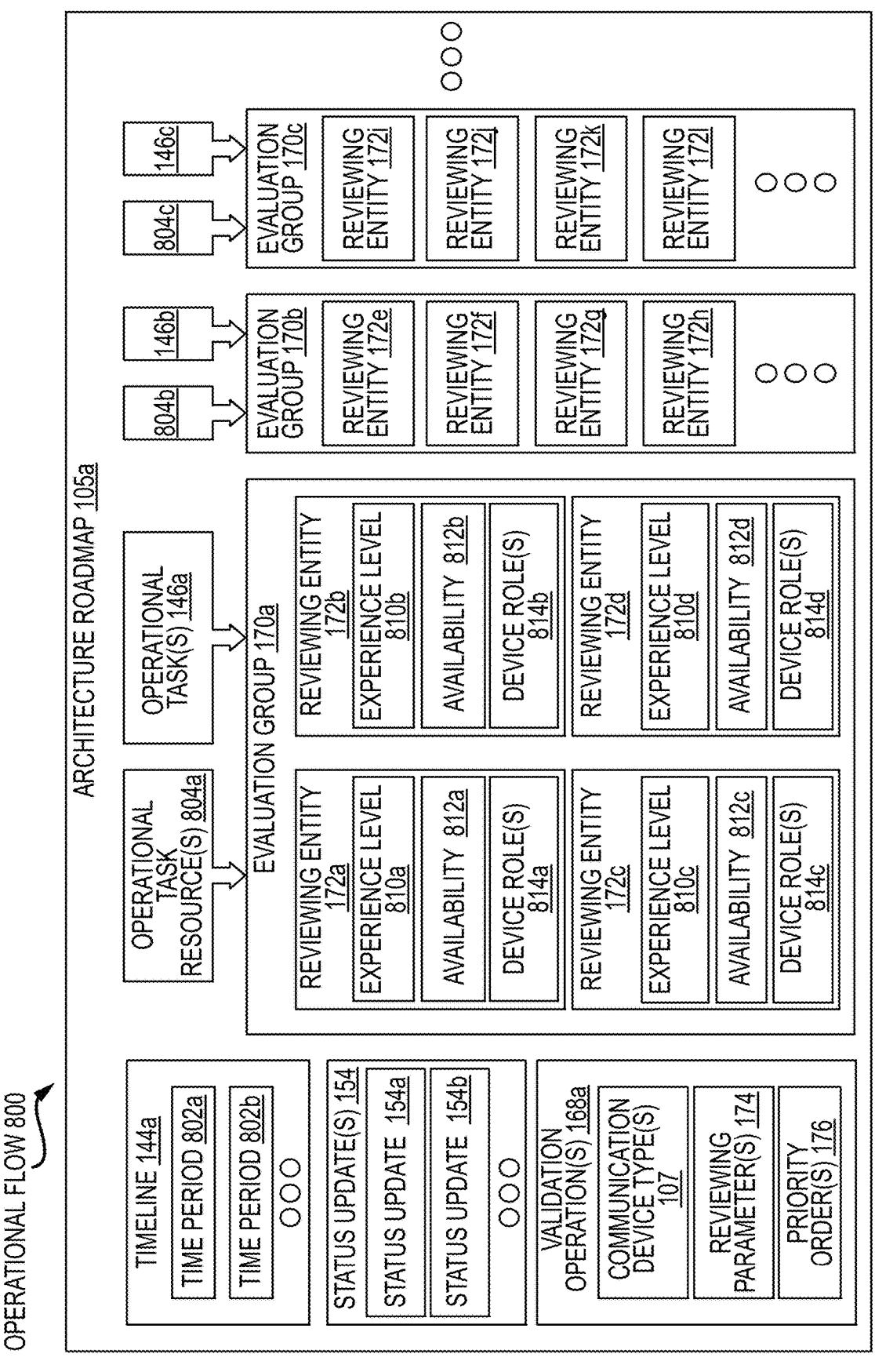
FIG. 8 illustrates an operation flow to perform validation operations in accordance with an architecture roadmap, in accordance with one or more embodiments.
Figure 9:
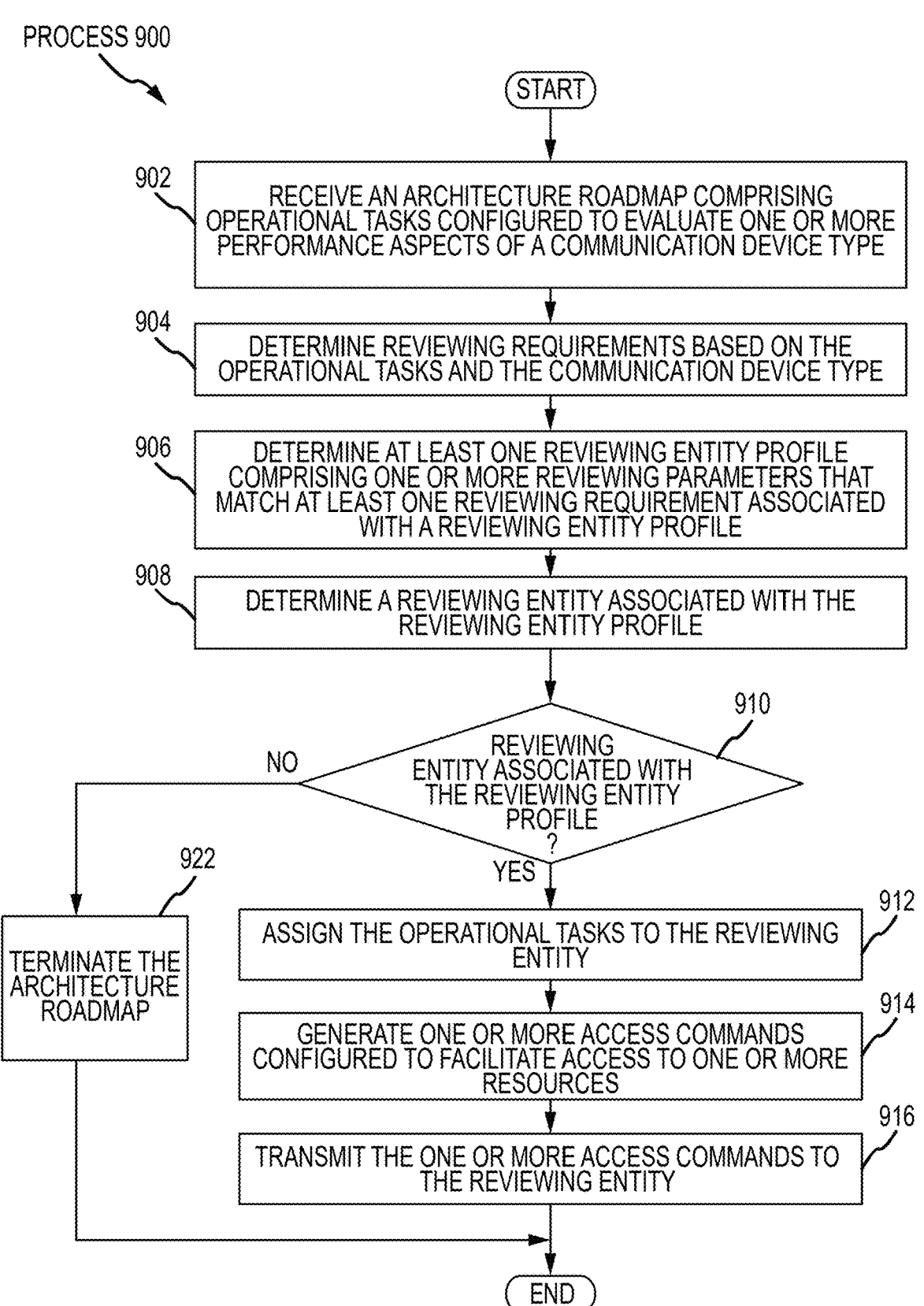
FIG. 9 illustrates an example flowchart of a method to perform the validation operations of FIG. 8, in accordance with one or more embodiments.

In one or more embodiments, systems and methods described herein are configured to dynamically organize, exchange, and monitor information relating to proposal requests, proposal responses, and architecture roadmaps to validate one or more performance aspects of one or more specific communication device types. In one or more embodiments, FIG. 1 illustrates a communication system 100 in which a server 102 configured to dynamically control one or more operations associated with proposals to validate one or more communication devices. FIG. 2 illustrates an operation flow 200 in which the communication system 100 of FIG. 1 is configured to dynamically generate information requests. FIG. 3 illustrates a process 300 to implement the operation flow 200 of FIG. 2. FIG. 4 illustrates an operation flow 400 in which the communication system 100 of FIG. 1 is configured to dynamically manage responses to information requests. FIG. 5 illustrates a process 500 to implement the operation flow 400 of FIG. 4. FIG. 6 illustrates an operation flow 600 in which the communication system 100 of FIG. 1 is configured to dynamically implement an architecture roadmap. FIG. 7 illustrates a process 700 to implement the operation flow 600 of FIG. 6. FIG. 8 illustrates an operation flow 200 in which the communication system 100 of FIG. 1 is configured to provide selective access to information during validation operations. FIG. 9 illustrates a process 900 to implement the operation flow 800 of FIG. 8.

Communication System Overview

FIG. 1 illustrates a diagram of a communication system 100 (e.g., a wireless communication system) comprises a server 102 configured to dynamically organize, exchange, and monitor information relating to proposal requests 103, proposal responses 104, and architecture roadmaps 105 to validate one or more performance aspects 106 of one or more specific communication device types 107. The proposal requests 103 may be information requests requesting information associated with one or more of the communication device types 107. The proposal responses 104 may be responses to one or more proposal requests 103. The architecture roadmaps 105 may be plans to perform one or more operational tasks over a time period. In the communication system 100 of FIG. 1, the server 102 may be communicatively coupled to the one or more networks 108 via one or more connections 110. In FIG. 1, the server 102 is communicatively coupled to multiple user equipment 112a-112g (collectively, user equipment 112) via multiple corresponding communication links 114a-114g (collectively, communication links 114) established between each user equipment 112 and the networks 108. As represented by a user equipment 112g, the user equipment 112 may be operated by one or more users 116. In the example of FIG. 1, the server 102 may be communicatively coupled to multiple additional devices in the communication system 100. While FIG. 1 shows the server 102 connected directly to the one or more networks 108 via the one or more connections 110, the server 102 may be located inside one of the networks 108 as part of one or more of the network components (e.g., not shown).

In one or more embodiments, the communication system 100 comprises the user equipment 112, the one or more networks 108, and the server 102. In some embodiments, the communication system 100 may comprise a Fifth Generation (5G) mobile network or wireless communication system, utilizing high frequency bands (e.g., 24 Gigahertz (GHz), 39 GHz, and the like) or lower frequency bands such (e.g., frequency range FR1 Sub 6 GHz-less than 7.125 GHz). In this regard, the communication system 100 may comprise a large number of antennas. In some embodiments, the communication system may perform one or more communication operations associated with 5G New Radio (NR) protocols described in reference to the Third Generation Partnership Project (3GPP). As part of the 5G NR protocols, the communication system 100 may perform one or more millimeter (mm) wave technology operations to improve bandwidth or latency in wireless communications.

In some embodiments, the communication system 100 may be configured to partially or completely enable communications via one or more various radio access technologies (RATs), wireless communication technologies, or telecommunication standards, such as Global System for Mobiles (GSM) (e.g., Second Generation (2G) mobile networks), Universal Mobile Telecommunications System (UMTS) (e.g., Third Generation (3G) mobile networks), Long Term Evolution (LTE) of mobile networks, LTE-Advanced (LTE-A) mobile networks, 5G NR mobile networks, or Sixth Generation (6G) mobile networks.

Communication System Components

Server

The server 102 is generally any device or apparatus that is configured to process data and communicate with the networks 108 and the user equipment 112. The server 102 may be configured to monitor, track data, control routing of signals, and control operations of certain electronic components in the communication system 100, associated databases, associated systems, and the like, via one or more interfaces. The server 102 is generally configured to oversee operations of a server processor 120 comprising a server processing engine 122. The operations of the server processing engine 122 are described further below. In some embodiments, the server 102 comprises the server processor 120, one or more server Input (I)/Output (O) interfaces 124, one or more databases 126, at least one data aggregator 128, and a server memory 130 communicatively coupled to one another. The server 102 may be configured as shown, or in any other configuration.

The server processor 120 may comprise one or more processors operably coupled to and in signal communication with the one or more server I/O interfaces 124, the databases

126, the data aggregator 128, and the server memory 130. The server processor 120 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The server processor 120 may be a programmable logic device, a microcontroller, a microprocessor, or any suitable combination of the preceding. The one or more processors in the server processor 120 are configured to process data and may be implemented in hardware or software executed by hardware. For example, the server processor 120 may be an 8-bit, a 16-bit, a 32-bit, a 64-bit, or any other suitable architecture. The server processor 120 may comprise an arithmetic logic unit (ALU) to perform arithmetic and logic operations, processor registers that supply operands to the ALU, and store the results of ALU operations, and a control unit that fetches software instructions such as server instructions 132 from the server memory 130 and executes the server instructions 132 by directing the coordinated operations of the ALU, registers and other components via the server processing engine 122. The server processor 120 may be configured to execute various instructions. For example, the server processor 120 may be configured to execute the server instructions 132 to perform functions or perform operations disclosed herein, such as some or all of those described with respect to FIGS. 1-9. In some embodiments, the functions described herein are implemented using logic units, FPGAs, ASICs, DSPs, or any other suitable hardware or electronic circuitry.

In some embodiments, the server processor 120 may be configured to perform one or more data exchange operations and one or more reporting operations simultaneously, sequentially, or in combination. The server processor 120 may be configured to alternate between the data exchange operations and the reporting operations in real-time. In some embodiments, "real-time" may refer to immediate or near immediate (e.g., within one or two seconds) change of operations. For example, an operation B may be considered to occur in real-time response to an operation A in a case where operation B occurs within a second after operation A. In other embodiments, "real-time" may refer to operations that occur in immediate response to triggering operations even in cases where responding operations occur several minutes after triggering operations.

In one or more embodiments, the server I/O interfaces 124 may be hardware configured to enable one or more operations 202-226 described in reference to FIG. 2, one or more operations 302-332 described in reference to FIG. 3, one or more operations 402-428 described in reference to FIG. 4, one or more operations 502-532 described in reference to FIG. 5, one or more operations 602-628 described in reference to FIG. 6, one or more operations 702-714 described in reference to FIG. 7, one or more operations described in reference to FIG. 8, and one or more banner operations 902-922 described in reference to FIG. 9. The server I/O interfaces 124 may comprise one or more antennas as part of a transceiver, a receiver, or a transmitter for communicating using one or more wireless communication protocols or technologies. In some embodiments, the server I/O interfaces 124 may be configured to communicate using, for example, NR or LTE using at least some shared radio components. In other embodiments, the server I/O interfaces 124 may be configured to communicate using single or shared radio frequency (RF) bands. The RF bands may be coupled to a single antenna, or may be coupled to multiple antennas (e.g., for a multiple-input multiple output (MIMO) configuration) to perform wireless communications.

The server I/O interfaces 124 may be configured to comprise one or more peripherals such as a network interface, one or more administrator interfaces, and one or more displays. The server network interfaces that may be part of the server I/O interfaces 124 may be any suitable hardware or software (e.g., executed by hardware) to facilitate any suitable type of communication in wireless or wired connections. These connections may comprise, but not be limited to, all or a portion of network connections coupled to additional network components in a core network, the user equipment 112, the Internet, an Intranet, a private network, a public network, a peer-to-peer network, the public switched telephone network, a cellular network, a local area network (LAN), a metropolitan area network (MAN), a wide area network (WAN), and a satellite network. The server network interface may be configured to support any suitable type of communication protocol.

The one or more administrator interfaces may be part of the server I/O interfaces 124 may be user interfaces configured to provide access and control to of the server 102 to one or more users (e.g., the user 116) or electronic devices. The one or more users may access the server memory 130 upon confirming one or more access credentials (e.g., a user profile) to demonstrate that access or control to the server 102 may be modified. In some embodiments, the one or more administrator interfaces may be configured to provide hardware and software resources to the one or more users. Examples of user devices comprise, but are not limited to, a laptop, a computer, a smartphone, a tablet, a smart device, an Internet-of-Things (IoT) device, a simulated reality device, an augmented reality device, or any other suitable type of device. The administrator interfaces may enable access to one or more graphical user interfaces (GUIs) via an image generator display (e.g., one or more displays), a touchscreen, a touchpad, multiple keys, multiple buttons, a mouse, or any other suitable type of hardware that allow users to view data or to provide inputs into the server 102. The server 102 may be configured to allow users to send requests to one or more user equipment 112.

In the example of FIG. 1, the one or more displays that may be part of the server I/O interfaces 124 may be configured to display a two-dimensional (2D) or three-dimensional (3D) representation of a service. Examples of the representations may comprise, but are not limited to, a graphical or simulated representation of an application, diagram, tables, or any other suitable type of data information or representation. In some embodiments, the one or more displays may be configured to present visual information to one or more users (not shown). The one or more displays may be configured to present visual information to the one or more users updated in real-time. The one or more displays may be a wearable optical display (e.g., glasses or a head-mounted display (HMD)) configured to reflect projected images and enable user to see between the one or more displays. For example, the one or more displays may comprise display units, one or more lenses, one or more semi-transparent mirrors embedded in an eye glass structure, a visor structure, or a helmet structure. Examples of display units comprise, but are not limited to, a cathode ray tube (CRT) display, a liquid crystal display (LCD), a liquid crystal on silicon (LCOS) display, a light emitting diode (LED) display, an organic LED (OLED) display, an active-matrix OLED (AMOLED) display, a projector display, or any other suitable type of display. In another embodiment, the one or more displays are a graphical display on the server

102. For example, the graphical display may be a tablet display, or a smartphone display configured to display the data representations.

The databases 126 may be configured to provide one or more memory resources to the server 102 and/or the user equipment 112. In one or more embodiments, the databases 126 are configured to store data that enables the server 102 to configure, manage and coordinate operations in one or more network components (e.g., managed servers). In some embodiments, the databases 126 store data used by the server 102 to operate as a halfway point in between the network components and other tools or databases. While the databases 126 are shown to be located within the server 102, the databases 126 may be located in the server 102 and/or at a distance from the server 102.

In one or more embodiments, the data aggregator 128 may be hardware and/or software executed by hardware configured to encrypt and/or encode data comprising multiple data formats. In this regard the data aggregator 128 may be configured as an encoder to convert data from one format into a coded format. The data aggregator 128 may be configured to perform multiple layers (e.g., levels of encryption) of the information stored in the databases 126 and/or the server memory 130. In some embodiments, the data aggregator 128 may be configured to decrypt and/or decode data comprising multiple data formats. In this regard, the data aggregator 128 may be configured as a decoder to convert data from one format into a decoded format. The data aggregator 128 may be configured to perform multiple layers (e.g., levels of decryption) of the information stored in the databases 126 and/or the server memory 130. The data aggregator 128 may be configured with updates dynamically and/or periodically over time. The data aggregator 128 may be configured over time or preconfigured via the one or more rules and policies 134.

The data aggregator 128 may be configured to aggregate data and/or commands relating to one or more operations performed by the server 102. In some embodiments, the data aggregator 128 may be configured to aggregate and/or compile one or more of the proposal orders 136, the proposal requests 103, and/or the proposal responses 104. The data aggregator 128 may be configured to receive multiple versions of specific data content and/or a same data content type. For example, after a first proposal request 103 is generated, the server 102 may be configured to transmit the first proposal request 103 to the data aggregator 128. Further, after a second proposal request 103 is generated, the server 102 may be configured to transmit the second proposal request 103 to the data aggregator 128. As the first proposal request 103 and the second proposal requests 103 are received at the data aggregator 128, the data aggregator 128 may be configured to combine the contents of the first proposal request 103 and the second proposal request 103 into a combined proposal request 103. Then, the data aggregator 128 may transmit the combined proposal request 103 to a corresponding OEM. In another example, as the first proposal request 103 and the second proposal requests 103 are received at the data aggregator 128, the data aggregator 128 may be configured to route the first proposal request 103 to a first OEM and the second proposal request 103 to a second OEM.

The server memory 130 may be volatile or non-volatile and may comprise a read-only memory (ROM), random-access memory (RAM), ternary content-addressable memory (TCAM), dynamic random-access memory (DRAM), and static random-access memory (SRAM). The server memory 130 may be implemented using one or more disks, tape drives, solid-state drives, and/or the like. The server memory 130 is operable to store the server instructions 132, the one or more rules and policies 134, one or more proposal orders 136 comprising one or more guidelines 138, the one or more proposal requests 103, one or more lists referencing communication device types 107, one or more knowledge areas 140, one or more performance aspects 106, review feedback 142, one or more proposal responses 104, one or more architecture roadmaps comprising one or more timelines 144, one or more operational tasks 146, one or more access commands 148, one or more recipients 150, one or more evaluation domains 152, one or more status updates 154, one or more override commands 156, one or more artificial intelligence (AI) commands 158 generated in accordance with one or more machine learning (ML) algorithms 160 trained by one or more corresponding ML models, one or more original equipment manufacturer (OEM) directories 162 comprising multiple OEM profiles 164, one or more validation operations 168, one or more evaluation groups 170 comprising one or more reviewing entity profiles 171 referencing at least one reviewing entity 172 and one or more corresponding reviewing parameters 174, and one or more priority orders 176. In the server memory 130, the server instructions 132 may comprise commands and controls for operating one or more specific network functions (NFs) in the one or more networks 108 when executed by the server processing engine 122 of the server processor 120. The server processing engine 122 may be configured to operate as a session border controller configured to execute the one or more server instructions 132, execute the one or more ML algorithms, and/or perform the one or more validation operations 168.

In one or more embodiments, the one or more rules and policies 134 are configured to instruct the one or more user equipment 112, one or more evaluation groups 170, and/or one or more reviewing entities 172 to establish one or more access commands 148 to perform one or more operations in the communication system 100 in a specific order. The one or more rules and policies 134 may enable automation of the analysis of the proposal requests 103, the proposal responses 104, implementation of the architecture roadmaps 105, and/or the one or more validation operations 168. Further, the rules and policies 134 may indicate one or more changes to the reviewing parameters 174. In some embodiments, the one or more rules and policies 134 may be predetermined and/or dynamically assigned by a corresponding user 116 or an organization associated with the server 102.

The one or more proposal orders 136 may be one or more communication signals configured to provide information and/or commands associated with one or more communication operations in the communication system 100. The proposal orders 136 may be configured to trigger modifications to one or more of the proposal requests 103. The proposal orders 136 may be configured to trigger access to one or more network resources in the communication system 100. The proposal orders 136 may comprise one or more guidelines 138 configured to instruct one or more knowledge areas 140 referencing one or more performance aspects 106 of a given communication device type 107. The proposal orders 136 may be configured to trigger a modification to network resources currently assigned to one or more verification operations 168. The proposal orders 136 may be configured to trigger one or more updates to services the communication system 100. The updates may be one or more service releases modifying services in the communication system 100.

In some embodiments, the proposal order 136 may be an order from one of the user equipment 112 and/or another device communicatively coupled with the server 102 to generate at least one proposal request 103. Herein, the proposal order 136 comprises one or more guidelines 138 associated with the proposal request 103. In response to receiving the proposal order 136 to generate the proposal request 103, the server 102 is configured to execute the ML algorithm 160 to evaluate the one or more guidelines 138 associated with the proposal request 103 in accordance with one or more ML models. The guidelines 138 may be information in the form of alphanumeric data, reference numbers, and/or indicators configured to represent one or more approaches for creating one or more proposal requests 103.

In one or more embodiments, the proposal orders 136 may be triggers to generate one or more proposal requests 103 for information associated with one or more communication device types 107. In this regard, the guidelines 138 may comprise suggestions that inform one or more sections to include in the proposal requests 103. For example, a proposal order 136 to generate a proposal request 103 for a specific communication device type 107 may be a trigger to generate an information request for a new computer device. In this regard, the guidelines 138 may indicate information to confirm before the new computer device is technically approved to join a specific network. In some embodiments, the guidelines 138 may reference multiple knowledge areas 140 associated with the specific communication device type 107. The knowledge areas 140 may be clusters comprising information related to one another by at least one commonality. For example, a first knowledge area 140 may be associated with connectivity of a given communication device type 107, a second knowledge area 140 may be associated with memory capabilities of the given communication device type 107, and a third knowledge area 140 may be associated with processing capabilities of the given communication device type 107 among others. The communication device types 107 may be information representative of one or more communication devices that share a common capability. For example, a communication device type 107 may comprise computer devices, Internet-of-Things devices, satellite-enabled devices, and the like. In some embodiments, certain communication device types 107 may comprise overlapping communication devices.

In one or more embodiments, the server 102 may be configured to receive and/or obtain a proposal order 136 comprising one or more guidelines 138. The server 102 may be configured to determine one or more knowledge areas 140 based on the guidelines 138. Each knowledge area 140 may be associated with a specific performance aspect 106 of the given communication device type 107. At this stage, the server 102 may be configured to determine one or more entry fields based on the knowledge areas 140. Herein, server 102 may be configured to structure the one or more entry fields into sections to be presented in the proposal requests 103. The server 102 may be configured to generate at least one proposal request 103 comprising the multiple entry fields arranged in corresponding sections. The at least one proposal requests 103 may be transmitted to an OEM as an entry form.

The one or more knowledge areas 140 may be at least partially different from the evaluation domains 152. Further, the one or more knowledge areas 140 may be equal to the evaluation domains 152.

In one or more embodiments, the OEM may provide one or more proposal responses 104 in response to the at least one proposal request 103. The proposal requests 103 may be at least partially completed versions of the proposal requests 103. The proposal responses 104 may comprise at least one input fields corresponding to each entry field in the proposal requests 103. Herein, the input fields may be evaluated in accordance with the one or more ML models. The server 102 may be configured to determine one or more evaluation domains 152 based on the input fields. The evaluation domains 152 may reference one or more operational tasks 146 configured to evaluate one or more performance aspects 106 of a given communication device type 107. The performance aspects 106 may be one or more characteristics and/or capabilities associated with a given communication device type 107. The operational tasks 146 may be evaluation operations and/or evaluation operations to be performed by a given reviewing entity 172. The operational tasks 146 may be prompts indicating an expected operation to be performed by the given reviewing entity 172. The operational tasks may be assigned by the server 102 to one or more specific evaluation groups 170 and/or one or more reviewing entities 172.

In one or more embodiments, the server 102 may be configured to determine at least one priority order 176 corresponding to the operational tasks 146. The priority order 176 may be a strict priority or a weighted priority associated with the operational tasks 146. The priority order 176 may be an order indicating a position of the operational tasks 146 in an architecture roadmap 105. For example, a first priority order 176 may indicate that a first operational task 146 may be performed before a second operational task 146. In another example, a second priority order 176 may indicate that a third operational task 146 may be performed after the second operational task 146 and before a fourth operational task 146.

In an example, one or more priority orders 176 corresponding to one or more operational tasks 146 may comprise a priority order 176a corresponding to an operational task 146a and a priority order 176b corresponding to an operational task 146b. The priority order 176a corresponding to the operational task 146a may be greater than the priority order 176b corresponding to the operational task 146b. The priority order 176a corresponding to the operational task 146a may be less than the priority order 176b corresponding to the operational task 146b. The priority order 176a corresponding to the operational task 146a may be equal to the priority order 176b corresponding to the operational task 146b.

In some embodiments, the server 102 may be configured to generate an architecture roadmap 105 comprising one or more timelines 144 to perform one or more operational tasks 146. The architecture roadmap 105 may comprise one or more operational tasks 146 to be performed over a corresponding timeline 144 and/or a corresponding priority order 176. The architecture roadmap 105 may be a plan to perform the operational tasks 146 over one or more time periods 802. At this stage, the server 102 may be configured to transmit the architecture roadmap 105 to one or more evaluation groups 170 and/or one or more reviewing entities 172. The timelines 144 may comprise one or more milestones to be obtained as certain operational tasks are performed over one or more periods of time.

In one or more embodiments, the reviewing entities 172 may be configured to provide review feedback 142 to the server 102 after performing one or more of the assigned operational tasks 146. The server 102 may be configured to evaluate the review feedback 142 and determine whether to amend a given architecture roadmap 105 based on the review feedback 142. The review feedback 142 may comprise one or more status updates 154 comprising suggestions to modify the architecture roadmap 105. The status updates 154 may be updates provided by the reviewing entities 172 and/or the evaluation groups 170 indicating whether a given operational task 146 is performed by a given reviewing entity 172. In some embodiments, the server 102 may be configured to evaluate the review feedback 142 and determine whether the suggested changes are approved or disapproved in accordance with current rules and policies 134. If the server 102 approves the suggested changes, the server 102 may be configured to update the architecture roadmap 105 and implement the architecture roadmap 105. Herein, the server 102 may be configured to generate an award to a recipient 150 (e.g., an OEM and/or an OEM representative). If the server 102 disapproves the suggested changes, the server 102 may be configured to proceed to a new stage in the architecture roadmap 105. Herein, the server 102 is configured to generate a report indicating that one or more operational tasks 146 were not performed by the corresponding reviewing entity 172.

The access commands 148 may be configured to establish one or more communication sessions between the server 102 and one or more user equipment 112. The access commands 148 may be configured to establish one or more communication sessions between the one or more user equipment 112. Each configuration command of the access commands 148 may be used to establish a communication session between a given network component of one or more network components in the communication network, the server 102, and/or user equipment 112. The access commands 148 may be routing and configuration information for reinstating and/or reestablishing communication sessions when a change is detected in the operations of the communication system 100. For example, in response to losing a specific communication session established with a first access command, the server 102 may attempt to reinstate the specific communication session based at least in part upon a second access command. The access commands 148 may be dynamically or periodically updated from network components in a core network. Herein, communication sessions refer to communication signals exchanged between the server 102 and additional network components in the core network. In some embodiments, the access commands 148 are provided to the server 102 from another of the network components performing a specific network function (NF). The access commands 148 may be configured to enable access of the one or more services. The access commands 148 may be configured to facilitate access to network resources in the communication network. The network resources may allow the operational tasks 146 to be evaluated by one or more of the reviewing entities 172.

In one or more embodiments, the access commands 148 may be a communication or a message configured to indicate a request for access of an application (via an API) or a service. In some embodiments, the access commands 148 may be a communication or a message configured to enable access to one or more entitlements in an application (via an API) or a service. The entitlements may be configured to provide one or more connectivity allowances (e.g., access) between the server 102, the user equipment 112, and the one or more of the network components. The entitlements may be assigned to specific departments or tenants. The entitlements may be predefined or dynamically defined in accordance with the rules and policies 134.

In one or more embodiments, the ML algorithm 160 may be executed by the server processor 120 to evaluate the proposal requests 103, the one or more proposal responses 104, and the one or more architecture roadmaps 105. The ML algorithm 160 may be configured to analyze and structure data in accordance with one or more machine learning models. Further, the ML algorithm 160 may be configured to interpret and transform information associated with the proposal requests 103, the proposal responses 104, and the architecture roadmaps 105 into structured data sets and subsequently stored as files or tables. The ML algorithm 160 may cleanse, normalize raw data, and derive intermediate data to generate uniform data in terms of encoding, format, and data types. The ML algorithm 160 may be executed to run user queries and advanced analytical tools on the structured data. The ML algorithm 160 may be configured to generate the one or more AI commands 158 based on current usage of network resources. In turn, the server processor 120 may be configured to generate the proposal requests 103, the one or more proposal responses 104, and the one or more architecture roadmaps 105 dynamically based on the outputs of the ML algorithm 160. The AI commands 158 may be parameters that modify allocation and/or assignment of the network resources. The AI commands 158 may be combined with the existing server instructions 132 to create the dynamic instructions and/or configuration commands. In one or more embodiments, the dynamic instructions and/or configuration commands may be dynamically generated updates for the existing server instructions 132.

In one or more embodiments, the ML algorithm 160 may be configured to generate one or more ML models that preemptively modify the assignments based at least in part upon the usage of the network resources in the communication system 100. In some embodiments, the server 102 may be configured to generate a library of ML models categorized in accordance with one or more categories and/or characteristics. The one or more categories and/or characteristics may comprise morphology, spectrum deployed, traffic utilization, services offered, broadband, voice, mission critical, strict SLAs, and the like. One or more of the ML models may be configured with attributes that are priority elements for each of the services performed at the communication cell, air interface capacity per cell, and/or numbers of network resources associated with a specific Quality of Service (QOS). In some embodiments, the ML models may be created and maintained based at least in part upon one or more different characteristics. After a period of time, the ML algorithm 160 following an existing ML model may be configured to generate one or more AI commands 158 that trigger changes in the allocation of the network resources.

In one or more embodiments, the operational tasks 146 in the architecture roadmap 105 may be performed as part of one or more validation operations 168. The validation operations 168 may be operations to technically approve a communication device and/or a communication device type 107. The communication device and/or communication device type 107 may be technically approved after a predefined amount of the reviewing entities 172 approve for the communication device and/or communication device type 107 to connect a specific communication network.

In one or more embodiments, the server 102 may be configured to implement the one or more architecture roadmap 105. After generating a specific architecture roadmap 105, the server 102 may be configured to execute the ML algorithm 160 to evaluate the operational tasks 146 associated with the architecture roadmap 105 in accordance with the one or more ML models. The server 102 may be configured to determine one or more reviewing guidelines

138 based on the operational tasks 146 and the communication device type 107 and assign the operational tasks 146 to at least one evaluation group 170 comprising one or more reviewing entities 172 in response to evaluating the operational tasks 146. Herein, the server 102 may be configured to receive at least one status update 154 from the at least one evaluation group 170. The status updates 154 indicating whether the operational tasks 146 are performed within the time period. The server 102 may be configured to determine whether the operational tasks 146 are performed within the time period. If the server 102 determines that the operational tasks 146 are performed within the time period, the server 102 generates a report referencing that the evaluation group 170 completed the operational tasks 146 within the time period. If the server 102 determines that the operational tasks 146 are not performed within the time period, the server 102 generates a report referencing that the operational tasks 146 are not completed by the evaluation group 170 within the time period. The report may be transmitted to the data aggregator 128. The architecture roadmap 105 may be terminated in cases where the server 102 determined that the operational tasks 146 are not completed within the period of time.

In one or more embodiments, the server 102 may be configured to provide selective access to network resources in a specific communication network. After generating a specific architecture roadmap 105, the server 102 may be configured to execute the ML algorithm 160 to evaluate the operational tasks 146 associated with the architecture roadmap 105 in accordance with the one or more ML models. The server 102 may be configured to determine one or more reviewing guidelines 138 based on the operational tasks 146 and the communication device type 107. At this stage, the server 102 may be configured to determine at least one reviewing entity profile 171 corresponding to one of the reviewing entities 172. Each of the reviewing guidelines 138 may comprise instructions for performing one or more of the operational tasks 146 configured to evaluate one or more performance aspects 106 of the communication device type 107 in response to evaluating the operational tasks 146. The server 102 may determine a reviewing entity 172 associated with the reviewing entity profile 171 and one or more reviewing parameters 174 and assign the operational tasks 146 to the reviewing entity 172 configured to perform the operational tasks 146 over a time period. The reviewing parameters 174 may be one or more capabilities of each reviewing entity 172. Examples of reviewing parameters 174 comprise subject-matter expertise, configuration roles in an organization, and an availability of a given reviewing entity 172 among others. The server 102 may be configured to generate one or more access commands 148 configured to facilitate access to network resources and transmit the access commands 148 to the reviewing entity 172. The network resources my allow the operational tasks to be evaluated by the reviewing entity 172. The one or more override commands 156 configured to override the review feedback 142 received from the reviewing entities 172.

The recipients 150 may be alphanumeric data, reference tables, and/or indicators configured to show one or more devices configured to receive information from the server 102. The recipients may be one or more OEMs, one or more user equipment 112, and/or other servers communicatively coupled to the server 102 via the network 108. The OEM directories 162 may comprise multiple OEM profiles 164 indicating information associated with one or more OEMs. The OEM profiles 164 may comprise multiple indicators referencing historic data of a given OEM. The historic data may comprise previous proposal orders 136, proposal requests 103, and/or proposal responses associated with the given OEM.

User Equipment

In one or more embodiments, each of the user equipment 112 (e.g., the user equipment 112a and a user equipment 112g representative of the user equipment 112a-112g) may be any computing device configured to communicate with other devices, such as the server 102, other network components in the networks 108, databases, and the like in the communication system 100. The user equipment 112 may be one or more network components associated with one or more recipients 150. Each of the user equipment 112 may be configured to perform specific functions described herein and interact with one or more network components in the networks 108. Examples of user equipment 112 comprise, but are not limited to, a laptop, a computer, a smartphone, a tablet, a smart device, an IoT device, a simulated reality device, an augmented reality device, or any other suitable type of device.

In one or more embodiments, referring to the user equipment 112a as a non-limiting example of the user equipment 112, the user equipment 112a may comprise a user equipment (UE) network interface 180, a UE I/O interface 182, a UE processor 184 configured to execute a UE processing engine (not shown), and a UE memory 186 comprising one or more UE instructions 188, a dynamic user profile 190, and one or more decentralized validation operations 192. The UE network interface 180 may be any suitable hardware or software (e.g., executed by hardware) to facilitate any suitable type of communication in wireless or wired connections. These connections may comprise, but not be limited to, all or a portion of network connections coupled to additional network components in the networks 108, the Internet, an Intranet, a private network, a public network, a peer-to-peer network, the public switched telephone network, a cellular network, a local area network (LAN), a metropolitan area network (MAN), a wide area network (WAN), and a satellite network. The UE network interface 180 may be configured to support any suitable type of communication protocol.

The UE I/O interface 182 may be hardware configured to perform one or more operations in the user equipment 112 upon execution of the server instructions 132 by the server processor 120. Further, the UE I/O interface 182 may be hardware configured to perform one or more operations upon execution of the UE instructions 188 by the UE processor 184. The UE I/O interface 182 may comprise one or more antennas as part of a transceiver, a receiver, or a transmitter for communicating using one or more wireless communication protocols or technologies. In some embodiments, the UE I/O interface 182 may be configured to communicate using, for example, 5G NR or LTE using at least some shared radio components. In other embodiments, the UE I/O interface 182 may be configured to communicate using single or shared RF bands. The RF bands may be coupled to a single antenna, or may be coupled to multiple antennas (e.g., for a MIMO configuration) to perform wireless communications. In some embodiments, the user equipment 112a may comprise capabilities for voice communication, mobile broadband services (e.g., video streaming, navigation, and the like), or other types of applications. In this regard, the UE I/O interface 182 of the user equipment 112a may communicate using machine-to-machine (M2M) communication, such as machine-type communication (MTC), or another type of M2M communication.

In one or more embodiments, the UE I/O interface 182 may comprise one or more incoming communication operations, one or more incoming reports 194, and/or one or more outgoing requests 196. The incoming communication operations may be some or all communication operations received at the user equipment 112a. The one or more incoming reports 194 may be one or more of reports received from the server 102 at the user equipment 112a. These reports may comprise the proposal requests 103, the one or more proposal responses 104, one or more architecture roadmaps 105, and/or one or more of the validation operations 168. The incoming reports 194 may be any data and/or information in the UE I/O interface 182 comprising text data and image data representative of the reports generated by the server 102. The text data and/or the image data may be static or dynamic. The text data may comprise alphanumeric data strings organized in an organized and/or randomize appearance in the UE I/O interface 182. The image data may be representative of the entry forms presented in the UE I/O interface 182. For example, the image data may comprise information about videos or images shown in the UE I/O interface 182 via services (e.g., user interface (UI) in applications). The one or more outgoing requests 196 may be one or more of the proposal orders 136 received by the server 102.

In some embodiments, the user equipment 112a is communicatively coupled to one or more of the networks 108 via one or more communication links 114. The user equipment 112a may be a device with cellular communication capability such as a mobile phone, a hand-held device, a computer, a laptop, a tablet, a smart watch or other wearable device, or virtually any type of wireless device. In some applications, the user equipment 112 may be referred to as a UE, UE device, or terminal.

The UE processor 184 may comprise one or more processors operably coupled to and in signal communication with the UE network interface 180, the UE I/O interface 182 interface 182, and the UE memory 186. The UE processor 184 is any electronic circuitry, including, but not limited to, state machines, one or more CPU chips, logic units, cores (e.g., a multi-core processor), FPGAs, ASICs, or DSPs. The UE processor 184 may be a programmable logic device, a microcontroller, a microprocessor, or any suitable combination of the preceding. The one or more processors in the UE processor 184 are configured to process data and may be implemented in hardware or software executed by hardware. For example, the UE processor 184 may be an 8-bit, a 16-bit, a 32-bit, a 64-bit, or any other suitable architecture. The UE processor 184 comprises an ALU to perform arithmetic and logic operations, processor registers that supply operands to the ALU, and store the results of ALU operations, and a control unit that fetches software instructions such as the UE instructions 188 from the UE memory 186 and executes the UE instructions 188 by directing the coordinated operations of the ALU, registers, and other components via the UE processing engine (not shown). The UE processor 184 may be configured to execute various instructions. For example, the UE processor 184 may be configured to execute the UE instructions 188 to implement functions or perform operations disclosed herein, such as some or all of those described with respect to FIGS. 1-9. In some embodiments, the functions described herein are implemented using logic units, FPGAs, ASICs, DSPs, or any other suitable hardware or electronic circuitry.

In some embodiments, the dynamic user profile 190 is configured to be a centralized hub for all user profiles associated with the user 116. The dynamic user profile 190 may be configured to actively store credentials and preferences from any services associated with the user equipment 112a. In other embodiments, the dynamic user profile 190 may actively provide the user equipment 112a with a centralized reference profile that is updated specifically for the user 116. The dynamic user profile 190 may cross-associate user preferences among services (i.e., applications or subscriptions) and any entities frequented by the user 116 (e.g., retail organizations, airlines, restaurants, and the like). In some embodiments, the dynamic user profile 190 may provide access to a data exchange mechanism that the user equipment 112a may leverage to exchange data in endpoint terminals in physical environments and virtual environments. In this regard, the dynamic user profile 190 may provide a universal virtual database in the user equipment 112a.

Networks

The networks 108 may be a network configured to manage communication sessions for the user equipment 112. In one or more embodiments, the networks 108 may establish connections between user equipment 112 and the server 102 in accordance with one or more communication protocols. The networks 108 may be one or more interconnected networks 108 associated with one or more organizations. In this regard, the networks 108 may be configured to access resources associated to specific services in accordance with corresponding service directories. The networks 108 may comprise one or more network components (not shown) configured to perform one or more NFs. In some embodiments, the networks 108 may comprise a core network that enables the user equipment 112 to communicate with the server 102, or another type of device. The networks 108 may implement a communication method that does not require the establishment of a specific communication protocol connection between the user equipment 112 and one or more of the networks 108. The networks 108 may include one or more types of network devices (not shown), which may perform different NFs.

In some embodiments, the networks 108 may comprise a 5G NR or an LTE access network (e.g., an evolved packet core (EPC) network) among others. In this regard, the networks 108 may comprise one or more logical networks implemented via wireless connections or wired connections. Each logical network may comprise an end-to-end virtual network with dedicated power, storage, or computation resources. Each logical network may be configured to perform a specific application comprising individual policies, rules, or priorities. Further, each logical network may be associated with a particular Quality of Service (QOS) class, type of service, or particular user associated with one or more of the user equipment 112. For example, a logical network may be a Mobile Private Network (MPN) configured for a particular organization. In this example, the user equipment 112a may be configured to connect to one or more particular network slices (i.e., logical networks) in the networks 108.

In the example system 100 of FIG. 1, the networks 108 may facilitate communication within the communication system 100. This disclosure contemplates that the networks 108 may be any suitable network operable to facilitate communication between the server 102 and the user equipment 112. The networks 108 may include any interconnecting system capable of transmitting audio, video, signals, data, messages, or any combination of the preceding. The networks 108 may include all or a portion of a LAN, a WAN, an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, and the like), a Long Term Evolution (LTE) network, a Universal Mobile Telecommunications System (UMTS) network, a peer-to-peer (P2P) network, a Bluetooth network, a Near Field Communication network, a Zigbee network, or any other suitable network, operable to facilitate communication between the components of the communication system 100. In other embodiments, the communication system 100 may not have all of these components or may comprise other elements instead of, or in addition to, those above.

Operational Flow for Dynamic Generation of Information Requests

FIG. 2 illustrates an example operational flow 200 implemented by the communication system 100 of FIG. 1, in accordance with one or more embodiments. While the operational flow 200 comprises multiple operations 202-226 are shown to be performed by an admin console 250, the server 102, the data aggregator 128, and at least one original equipment manufacturer (OEM) 260, additional electronic devices or components in the server 102 (e.g., the server processor 120 in the server 102) or in the user equipment 112 (e.g., the UE processor 184 in the user equipment 112a) may be configured to perform one or more of the operations 202-226.

In one or more embodiments, the server 102 is configured to use the AI commands 158 optimized by one or more ML algorithms 160 to generate the proposal requests 103. In particular, the server 102 may be configured to train the ML algorithms 160 to assist in a process of populating the proposal requests 103 requesting information from one of the recipients 150. The ML algorithms 160 may be executed to generate the proposal requests 103 automatically based on a few datapoints relating to a specific communication device and/or a specific communication device type 107. The server 102 may be configured to suggest content of the proposal requests 103 based on current rules and policies 134 of an organization associated with the server 102 (e.g., comprising current certification approaches and/or technical approval techniques), technology advancements associated with the subject matter of the proposal requests 103 (e.g., type of device requested), and historical data associated with the subject matter of the proposal requests 103 (e.g., historical tests performed on devices similar to the current device requested) among others. The ML algorithms 160 may be dynamically trained using the aforementioned elements and/or review feedback 142 as new sections are introduced by reviewing entities 172 for the proposal requests 103.

In FIG. 2, the operation flow 200 shows an admin console 250, the server 102, the data aggregator 128, and an OEM device 260 communicatively coupled to one another. The admin console 250 may be one of the user equipment 112 configured to provide one or more commands, controls, and/or data to the server 102. As described above, the data aggregator 128 may be located within the server 102 or at a different location. The OEM device 260 may be an electronic component associated with a corresponding OEM.

In the example of FIG. 2, at operation 202, the server 102 may be configured to obtain and/or receive a proposal order 136 from the admin console 250. In some embodiments, the server 102 may obtain the proposal order 136 from one of the databases 126. The proposal order 136 may be a trigger to generate a proposal request 103. At operation 204, after receiving the proposal order 136, the server 102 may be configured to execute an ML algorithm 160 to determine one or more guidelines 138 in the proposal order 136. At operation 206, the server 102 may be configured to determine one or more knowledge areas 140 based on the one or more guidelines 138. At operation 208, the server 102 may be configured to determine one or more entry fields based on the knowledge areas. Herein, the server 102 may be configured to execute the ML algorithm 160 to structure the entry fields in one or more sections and/or clusters for the proposal request 103. At operation 210, the server 102 may be configured to generate a proposal request 103 based on the entry fields.

The operation flow 200 may continue at operations 212-216. The operation flow 200 may comprise operations 212-216 performed at least partially before, during, and/or after the operations 202-210. At operation 212, the OEM device 260 may initiate a connection registration with to communicatively couple with the data aggregator 128. The connection registration may be a signal transmission, a broadcasted communication, and/or a message configured to trigger connectivity and/or communication link with the data aggregator 128. At operation 214, the data aggregator 128 may be configured to coordinate registration operations with the OEM device 260. The connection registration and the registration creation may be performed between the server 102 and the OEM device in embodiments where the data aggregator 128 is located within the server 102. Herein, the data aggregator 128 may be configured to compile data and/or commands from the server 102 before transmitting information to the OEM device 260.

At operation 218, the server 102 may be configured to transmit the proposal request 103 to the data aggregator 128. While the example in FIG. 2 shows one proposal request 103 transmitted from the server 102 to the data aggregator 128, there may be multiple proposal requests 103 that are compiled over time. At operation 220, the data aggregator 128 may be configured to aggregate one or more proposal requests 103. At operation 222, the data aggregator 128 may be configured to transmit the aggregated proposal requests 103 to the OEM device 260. In response to receiving the aggregated proposal requests, the OEM device 260 may be configured to transmit one or more proposal responses 104 in response to the aggregated proposal requests 103.

The operation flow 200 may conclude at operation 226, where the server 102 and the data aggregator 128 may be configured to coordinate analysis of the proposal responses 104.

Example Process to Dynamically Generate Information Requests

FIG. 3 illustrates an example flowchart of a process 300 configured to dynamically generate information requests (e.g., proposal requests 103), in accordance with one or more embodiments. In one or more embodiments, the process 300 comprises operations 302-332. Modifications, additions, or omissions may be made to the process 300. The process 300 may include more, fewer, or other operations than those shown below. For example, operations may be performed in parallel or in any suitable order. While at times discussed as the server 102, one or more of the user equipment 112, components of any of thereof, or any suitable system or components of the communication system 100 may perform one or more operations of the process 300. For example, one or more operations of the process 300 may be implemented, at least in part, in the form of server instructions 132 of FIG. 1, stored on non-transitory computer readable media, tangible media, machine-readable media (e.g., server memory 130 of FIG. 1 operating as a non-transitory computer readable medium) that when run by one or more processors (e.g., the server processor 120 of FIG. 1) may cause the one or more processors to perform operations described in operations 302-332 of the process 300. The process 300 may be performed during a maintenance window or outside a maintenance window.

The process 300 starts at operation 302, where the server 102 is configured to receive a proposal order 136 to generate a proposal request 103 associated with a communication device type 107. The proposal order 136 may comprise one or more guidelines 138. At operation 304, the server 102 is configured to determine multiple knowledge areas 140 based on multiple guidelines 138 found in the proposal order 136. At operation 306, the server 102 is configured to determine entry fields associated with each of the knowledge areas 140. The entry fields may be determined for multiple topics and/or sections.

The process 300 continues to operation 310, where the server 102 is configured to determine whether the entry fields have been used in a previous proposal request 103. For example, the server 102 may be configured to compare the entry fields to existing entry fields found in the databases 126. If the server 102 determines that the entry fields have not been used in a previous proposal request 103 (i.e., NO), the process 300 proceeds to operation 312. At operation 312, the server 102 is configured to generate the proposal request 103 comprising the entry fields. If the server 102 determines that the entry fields have been used in a previous proposal request 103 (i.e., YES), the process 300 proceeds to operation 322. At operation 322, the server 102 is configured to obtain the previous proposal request 103. This previous proposal request 103 may be a copy of a previous proposal request 103 generated at a previous instance were the similar guidelines 138 were used to generate similar entry fields.

The process 300 may conclude at operation 332. At operation 332, the server 102 is configured to transmit the proposal request 103 to a proposal aggregator 128 configured to compile information associated with the communication device type 107.

In one or more embodiments, the server 102 may be configured to evaluate the guidelines 138 in proposal orders 136 to determine the one or more entry fields. After determining the entry fields, and generating a corresponding proposal request 103, the server 102 may be configured to transmit the proposal request 103 to a reviewing entity 172. In turn, the reviewing entity 172 may provide review feedback 142 to the server 102. At this stage, the server 102 may execute the ML algorithm 160 to evaluate any changes included in the review feedback 142. Herein, the server 102 may be approve or disapprove the changes suggested in the review feedback 142. The changes may be updated guidelines 138 comprising new knowledge areas 140 and/or entry fields. The changes may be updated guidelines 138 comprising modified versions of the current knowledge areas 140 and/or entry fields. If the server 102 approves the changes suggested in the review feedback 142, the server 102 may be configured to update the proposal request 103 to include one or more entry field derived based on one or more knowledge areas 140. In some embodiments, the server 102 may be configured to automatically approve or disapprove the entry fields in the proposal request 103 if the reviewing entity 172 does not provide a corresponding review feedback 142 within a predefined period of time (e.g., review feedback 142 is absent).

In one or more embodiments, the process 300 comprises a streamlined approach to generate proposal requests 103. In some embodiments, the process 300 may be configured to provide updates to users internally (e.g., to other servers 102 and/or user equipment 112 in the communication network) and/or externally (e.g., to OEMs) in the form of reports. These reports may comprise messages, notification alerts, and/or status updates 154 indicating that a change occurred in the process 300.

Operational Flow for Dynamic Analysis of Responses to Information Requests

FIG. 4 illustrates an example operational flow 400 implemented by the communication system 100 of FIG. 1, in accordance with one or more embodiments. While the operational flow 400 comprises multiple operations 402-428 are shown to be performed by multiple reviewing entities 172a-172g, the server 102, and the data aggregator 128, additional electronic devices or components in the server 102 (e.g., the server processor 120 in the server 102) or in the user equipment 112 (e.g., the UE processor 184 in the user equipment 112a) may be configured to perform one or more of the operations 402-428.

In one or more embodiments, the server 102 is configured to use the AI commands 158 optimized by one or more ML algorithms 160 to manage proposal responses 104. The proposal responses 104 may be responses to proposal requests 103 for information (e.g., entry forms and/or questionnaires) to OEMs. In particular, the server 102 may be configured with the ML algorithms 160 to assist in evaluating responses to an entry form requesting information. After execution, the ML algorithms 160 may be configured to evaluate individual information provided in the proposal responses 104 and create operational tasks 146 for one or more reviewing entities 172 before any users review the proposal responses 104. The proposal responses 104 may include multiple information selections associated with a specific communication device and/or a specific communication device type 107. Based on the information selections in a given proposal response 104, the ML algorithm 160 may be configured to select one or more evaluation groups 170 in an organization that may be capable of evaluating whether content in a specific input field in a specific proposal response 104 is considered to be acceptable. If content in a specific input field is acceptable, an award requesting additional information may be provided to a given OEM. The server 102 may be configured to suggest specific evaluation operations (e.g., operational tasks 146) to be performed by reviewing entities 172 of the one or more evaluation groups 170 while reviewing specific line items in the proposal response 104. The ML algorithms 160 may be further dynamically trained on the results to the evaluation operations. The ML algorithms 160 may dynamically update/modify the evaluation operations suggested for a given evaluation group 170 based on the results of another evaluation group 170. After a predefined number of the evaluation groups 170 provide corresponding results (e.g., in the form of review feedback 142), a notice (e.g., a report) may be generated to a source (e.g., a specific OEM) of the proposal response 104 indicating that the proposal response 104 was accepted/not accepted (e.g., award granted/not granted and/or award approved/disapproved). The source of the original proposal response 104 may follow up with comments to the notice comprising addenda. The ML algorithms 160 may be configured to generate an architecture roadmap 105 (e.g., certification roadmap/process) including multiple analyses to be performed over a period of time based on the notice and any comments to the notice. The reviewing entities 172 may be configured to manage the proposal responses 104 while accessing selected information associated with corresponding proposal requests 103.

In FIG. 4, the operation flow 400 shows a reviewing entity 172a, the server 102, the data aggregator 128, and an OEM device 260 communicatively coupled to one another. The reviewing entity 172a may be one of the reviewing entities 172. As described above, the data aggregator 128 may be located within the server 102 or at a different location. The OEM device 260 may be an electronic component associated with a corresponding OEM.

In the example of FIG. 4, at operation 402, the reviewing entity 172a may be configured to initiate a connection registration with the server 102. The connection registration may be a signal transmission, a broadcasted communication, and/or a message configured to trigger connectivity and/or communication link with the server 102. At operation 404, the server 102 may be configured to transmit a registration creation. At operation 406, the server 102 may be configured to await one or more operational tasks 146 from the server 102.

The operation flow may continue at operations 408-412. The operation flow 400 may comprise operations 408-412 performed at least partially before, during, and/or after the operations 402-406. At operation 408, the OEM device 260 may be configured to transmit one or more proposal responses 104 to the data aggregator 128. The proposal responses 104 may be responses to one or more proposal requests 103. At operation 410, the data aggregator 128 may be configured to compile one or more proposal responses 104. Herein, the data aggregator 128 may be configured to aggregate and/or compile some or all the proposal responses 104 received from the OEM device 260.

The operation flow 400 may continue at operations 412-426. At operation 412, the data aggregator 128 may be configured to transmit the aggregated proposal responses 104 to the server 102. At operation 414, the server 102 is configured to execute the ML algorithm 160 to determine one or more evaluation domains 152. At operation 416, the server 102 may be configured to determine one or more operational tasks 146 based on the one or more evaluation domains 152. At operation 418, the server 102 may be configured to determine a priority order 176 corresponding to the aggregated proposal requests 103. The priority order 176 may be configured to indicate a priority for each of the operational tasks 146. At operation 420, the server 102 may be configured to execute the ML algorithm 160 to generate an architecture roadmap 105 comprising the operational tasks 146 in a timeline 144. For example, the architecture roadmap 105 may comprise one or more operational tasks 146 to be performed by the reviewing entity 172a within a specific time period. At operation 422, the one or more operational tasks 146 may be transmitted to the reviewing entity 172a. At operation 424, the reviewing entity 172a may be configured to transmit review feedback 142 to the server 102. The review feedback 142 may comprise one or more status updates 154 indicating whether the operational tasks 146 are completed, and/or any proposed changes to the operational tasks 146. At operation 426, the server 102 may be configured to accept and/or deny the review feedback 142.

The operation flow 400 may conclude at operation 428, where the reviewing entity 172a, the server 102, the data aggregator 128, and/or the OEM device may be configured to coordinate establishing an award associated with the architecture roadmap 105. The awards may grant an OEM associated with the OEM device 260 an opportunity to provide and/or manufacture one or more communication devices of the communication device type 107.

Example Process to Dynamically Manage Responses to Information Requests

FIG. 5 illustrates an example flowchart of a process 500 configured to dynamically manage responses (e.g., proposal responses 104) to information requests (e.g., proposal requests 103), in accordance with one or more embodiments. In one or more embodiments, the process 500 comprises operations 502-532. Modifications, additions, or omissions may be made to the process 500. The process 500 may include more, fewer, or other operations than those shown below. For example, operations may be performed in parallel or in any suitable order. While at times discussed as the server 102, one or more of the user equipment 112, components of any of thereof, or any suitable system or components of the communication system 100 may perform one or more operations of the process 500. For example, one or more operations of the process 500 may be implemented, at least in part, in the form of server instructions 132 of FIG. 1, stored on non-transitory computer readable media, tangible media, machine-readable media (e.g., server memory 130 of FIG. 1 operating as a non-transitory computer readable medium) that when run by one or more processors (e.g., the server processor 120 of FIG. 1) may cause the one or more processors to perform operations described in operations 502-532 of the process 500. The process 500 may be performed during a maintenance window or outside a maintenance window.

The process 500 starts at operation 502, where the server 102 is configured to receive a proposal response 104 to a proposal request 103 associated with a communication device type 107. At operation 504, the server 102 is configured to determine multiple evaluation domains 152 based on multiple input fields found in the proposal response 104. At operation 506, the server 102 is configured to determine one or more operational tasks 146 based on the evaluation domains 152. At operation 508, the server 102 is configured to determine a priority order 176 associated with the operational tasks 146.

The process 500 continues to operation 510, where the server 102 is configured to determine whether there is a previous architecture roadmap 105 associated with the operational tasks 146. For example, the server 102 may be configured to compare the operational tasks 146 to existing operational tasks 146 found in the databases 126. If the server 102 determines that there are no previous architecture roadmaps 105 associated with the operational tasks 146 (i.e., NO), the process 500 proceeds to operation 512. At operation 512, the server 102 is configured to generate the architecture roadmap 105 comprising the operational tasks 146. If the server 102 determines that there is a previous architecture roadmap 105 associated with the operational tasks 146 (i.e., YES), the process 500 proceeds to operation 522. At operation 522, the server 102 is configured to obtain the previous architecture roadmap 105.

The process 500 may conclude at operation 532. At operation 532, the server 102 is configured to transmit the architecture roadmap 105 to one or more reviewing entities 172 configured to evaluate one or more performance aspects associated of the communication device type 107.

In one or more embodiments, the server 102 may be configured to evaluate the proposal responses 104 to determine the one or more input fields. After determining the input fields, and generating a corresponding operational task 146, the server 102 may be configured to transmit the operational tasks 146 in architecture roadmaps 105 to one or more reviewing entities 172 in one or more evaluation groups 170. In turn, the reviewing entity 172 may provide review feedback 142 to the server 102. At this stage, the server 102 may execute the ML algorithm 160 to evaluate any changes included in the review feedback 142. Herein, the server 102 may be approve or disapprove the changes suggested in the review feedback 142. The changes may be updated guidelines 138 comprising new operational tasks 146 and/or results from existing operational tasks 146. If the server 102 approves the changes suggested in the review feedback 142, the server 102 may be configured to update the architecture roadmap 105 to include one or more of the new operational tasks 146. In some embodiments, the server 102 may be configured to generate awards to OEMs in cases where the reviewing entities 172 indicate that the communication device type 107 is approved to join the communication network. The award may indicate that the communication device type 107 is technically approved to join the communication network.

In one or more embodiments, the process 500 comprises a streamlined approach to manage proposal responses 104 to proposal requests 103. In some embodiments, the process 500 may be configured to provide updates to users internally (e.g., to other servers 102 and/or user equipment 112 in the communication network) and/or externally (e.g., to OEMs) in the form of reports. These reports may comprise messages, notification alerts, and/or status updates 154 indicating that a change occurred in the process 500.

Operational Flow for Dynamic Implementation of an Architecture Roadmap

FIG. 6 illustrates an example operational flow 600 implemented by the communication system 100 of FIG. 1, in accordance with one or more embodiments. While the operational flow 600 comprises multiple operations 602-628 are shown to be performed by multiple evaluation groups 170 and the server 102, additional electronic devices or components in the server 102 (e.g., the server processor 120 in the server 102) or in the user equipment 112 (e.g., the UE processor 184 in the user equipment 112a) may be configured to perform one or more of the operations 602-628.

In one or more embodiments, the server 102 is configured to use the AI commands 158 optimized by one or more ML algorithms 160 to implement an architecture roadmap 105. The architecture roadmap 105 may be configured to certify a communication device and/or a communication device type 107. The server 102 may be configured to execute the ML algorithms 160 to assist in automating implementation of the architecture roadmaps 105. The architecture roadmaps 105 may be plans for one or more reviewing entities 172 to perform the one or more operational tasks 146 to evaluate performance aspects 106 of the communication device type 107 over a period of time. The reviewing entities 172 may be configured to generate review feedback 142 indicating whether certain performance aspects 106 of the communication device and/or the communication device types 107 meet one or more performance thresholds. In some embodiments, the ML algorithms 160 may be configured to generate the architecture roadmap 105 including one or more tests (e.g., the operational tasks 146) to be performed on a specific communication device to be certified (e.g., technically approved). The ML algorithms 160 may evaluate multiple conditions associated with the communication device that is certified. These conditions may include a tier level associated with a given OEM, a version level (e.g., releases) associated with the communication device, historical data associated with the communication device, and user feedback provided in the request and response processes among others. The ML algorithms 160 may be configured to provide a periodic (e.g., daily, weekly, monthly and the like) set of operational tasks 146 for one or more evaluation groups 170 in an organization over time. The operational tasks 146 of a first period of time may cause the operational tasks 146 of a second period of time to be dynamically modified. The ML algorithms 160 may be trained based on the review feedback 142 obtained in each of the analyses. The ML algorithms 160 may be configured to generate a certification result (e.g., a certification approval) upon successful completion of the architecture roadmap 105. The reviewing entities 172 performing the operational tasks 146 in the architecture roadmap 105 may have access to selected information associated with corresponding proposal requests 103 for information and management of any associated proposal responses 104.

In FIG. 6, the operation flow 600 shows the server 102 and multiple evaluation groups 170 communicatively coupled to one another. While the evaluation groups 170 show an evaluation group 170a, an evaluation group 170b, and an evaluation group 170g, the evaluation groups 170a-170g may be the same, more, and/or less than those shown in FIG. 6.

In the example of FIG. 6, at operation 602, the server 102 may be configured to generate an architecture roadmap 105 comprising one or more operational tasks 146 to be performed in a timeline 144. In some embodiments, the server 102 may generate the architecture roadmap 105 comprising multiple operational tasks 146. In this case, the operational tasks 146 may comprise two different sets of operational tasks 146. In some embodiments, a first set of operational tasks 146a may comprise one or more tasks to be performed by a group of reviewing entities 172a comprising a set of reviewing parameters 174a and a second set of operational tasks 146b may comprise one or more tasks to be performed by a group of reviewing entities 172b comprising a set of reviewing parameters 174b. In other embodiments, the operational tasks 146a and the operational tasks 146b may comprise tasks to be performed by a group of reviewing entities 172c comprising a set of reviewing parameters 174c. The reviewing entities 172a-172c may comprise at least a portion of similar reviewing parameters 174. As described above, the reviewing parameters 174 are characteristics and/or capabilities of the reviewing entities 172 that inform the ML algorithm 160 on whether certain reviewing entities 172 are configured to perform specific operational tasks 146. At operation 604, the server 102 may be configured to execute an ML algorithm 160 to assign the operational tasks 146a and the operational tasks 146b to one or more reviewing entities 172. At operation 606, the server 102 may assign the operational tasks 146a to the evaluation group 170a. At operation 608, the server 102 may assign the operational tasks 146b to the evaluation group 170b. The evaluation group 170a may comprise the reviewing entities 172a and the evaluation group 170b may comprise the reviewing entities 172b. The server 102 may be configured to assign the operational tasks 146 based on the corresponding reviewing parameters 174 associated with the reviewing entities 172. The operational tasks 146 may be assigned to be completed within a predefined period of time.

At operation 610, the reviewing entities 172a in the evaluation group 170a are configured to perform one or more of the operational tasks 146a. In the conjunction with operation 610, at operation 612, the evaluation group 170b may transmit review feedback 142b to inform the server 102 that one or more of the reviewing entities 172b cannot complete one or more of the operational tasks 146b within the predefined period of time. In some embodiments, the server 102 may be configured to execute the ML algorithm

160 to update the architecture roadmap 105 to modify the predefined period of time. In this case, at operation 614, the server 102 may be configured to reassign the operational tasks 146b to another evaluation group 170. At operation 616, the server 102 reassigns the operational tasks 146b to the evaluation group 170g. The reassignment may comprise all or some of the operational tasks 146b. As described above, the operational tasks 146 may be perform in sequence and/or simultaneously. For example, the operational tasks 146a may be performed at least partially at a same time than the operational tasks 146b.

At operation 618, the evaluation group 170a may be configured to provide one or more status updates 154 to the server 102. The status updates 154 may comprise progress reports indicating results, advances, and/or setbacks in the completion of the operational tasks 146a. In cases where the operational tasks 146a comprise tests, the status updates 154 may comprise test results. In conjunction with operation 620, the evaluation group 170g may be configured to perform the operational tasks 146b within the predefined period of time. At operation 622, the evaluation group 170a may be configured to provide review feedback 142a to the server 102. At operation 624, the evaluation group 170g may be configured to provide review feedback 142g to the server 102. At operation 626, the server 102 may be configured to approve and/or disapprove some or all of the changes suggested in the review feedback 142a and/or review feedback 142b.

The operation flow 600 may conclude at operation 628, where the server 102 and the evaluation groups 170 may be configured to coordinate completion or termination of the architecture roadmap 105 based on the review feedback 142. The server 102 may terminate the architecture roadmap 105 if the review feedback 142 is disapproved because the completed operational tasks 146 indicate that one or more performance aspects 106 of the communication device type 107 cannot meet operation standards of the communication network. The server 102 may complete the architecture roadmap 105 if the review feedback 142 is approved because the completed operational tasks 146 indicate that the performance aspects 106 of the communication device type 107 meet operation standards of the communication network.

In one or more embodiments, the server 102 may be configured to override and/or skip the results of the evaluation groups 170 based on historical data associated with a specific OEM profile 164. For example, an architecture roadmap 105a may be generated based on the proposal responses 104a provided by a first OEM associated with an OEM profile 164a and an architecture roadmap 105b may be generated based on the proposal responses 104b provided by a second OEM associated with an OEM profile 164b. The architecture roadmap 105a may comprise operational tasks 146a that are similar to operational tasks 146b in the architecture roadmap 105b. In accordance with first historical data associated with the OEM profile 164a, the server 102 may determine to skip assigning some of the operational tasks 146a. In accordance with second historical data associated with the OEM profile 164b, the server 102 may determine to assign all of the operational tasks 146b. In some embodiments, certain operational tasks 146 may be skipped in a given architecture roadmap 105 is generated as part of a security maintenance release (SMR) and/or an emergency maintenance release (EMR) of a communication device type 107. The SMR and the EMR may be updates to one or more performance aspects 106 of a specific communication device type 107. The SMR may comprise security-related updates. The EMR may comprise updates to improve operations in an existing process performed by the specific communication device type 107.

Example Process to Dynamically Implement an Architecture Roadmap

FIG. 7 illustrates an example flowchart of a process 700 configured to dynamically implement am architecture roadmap (e.g., proposal requests 103), in accordance with one or more embodiments. In one or more embodiments, the process 700 comprises operations 702-714. Modifications, additions, or omissions may be made to the process 700. The process 700 may include more, fewer, or other operations than those shown below. For example, operations may be performed in parallel or in any suitable order. While at times discussed as the server 102, one or more of the user equipment 112, components of any of thereof, or any suitable system or components of the communication system 100 may perform one or more operations of the process 700. For example, one or more operations of the process 700 may be implemented, at least in part, in the form of server instructions 132 of FIG. 1, stored on non-transitory computer readable media, tangible media, machine-readable media (e.g., server memory 130 of FIG. 1 operating as a non-transitory computer readable medium) that when run by one or more processors (e.g., the server processor 120 of FIG. 1) may cause the one or more processors to perform operations described in operations 702-714 of the process 700. The process 700 may be performed during a maintenance window or outside a maintenance window.

The process 700 starts at operation 702, where the server 102 is configured to receive an architecture roadmap 105 comprising operational tasks 146 configured to evaluate one or more performance aspects 106 of a communication device type 107. At operation 704, the server 102 is configured to assign the operational tasks 146 to one or more evaluation groups 170. At operation 706, the server 102 is configured to receive one or more status updates 154 from the one or more evaluation groups 170. At operation 708, the server 102 is configured to determine whether the operational tasks 146 are performed within a time period 802.

The process 700 continues to operation 710, where the server 102 is configured to determine whether the operational tasks 146 are performed within the time period 802. If the server 102 determines that the operational tasks 146 are performed within the time period 802 (i.e., YES), the process 700 proceeds to operation 712 and operation 714. If the server 102 determines the operational tasks 146 are not performed within the time period 802 (i.e., NO), the process 500 proceeds to operation 722.

The process 700 may conclude at operation 712 and operation 714. At operation 712, the server 102 is configured to generate a report referencing that the one or more evaluation groups 170 completed the operational tasks 146. At operation 714, the server 102 is configured to transmit the report to a data aggregator 128. In turn, the data aggregator 128 may be configured to share compiled reports to one or more devices in an organization.

The process 700 may conclude at operation 722. At operation 722, the server 102 is configured to terminate the architecture roadmap 105.

In one or more embodiments, the process 700 comprises a streamlined approach to implement architecture roadmaps 105. In some embodiments, the process 700 may be configured to provide updates to users internally (e.g., to other servers 102 and/or user equipment 112 in the communication network) and/or externally (e.g., to OEMs) in the form of reports. These reports may comprise messages, notification alerts, and/or status updates 154 indicating that a change occurred in the process 700.

Operational Flow for Selective Access to Information During Validation Operations FIG. 8 illustrates an example operational flow 800 implemented by the communication system 100 of FIG. 1, in accordance with one or more embodiments. While the operational flow 800 comprises multiple validation operations 820 shown to be performed by the evaluation groups 170 in relation to the architecture roadmap 105a, additional electronic devices or components in the server 102 (e.g., the server processor 120 in the server 102) or in the user equipment 112 (e.g., the UE processor 184 in the user equipment 112a) may be configured to perform one or more of the validation operations 820.

In one or more embodiments, the server 102 is configured to use the AI commands 158 optimized by one or more ML algorithms 160 to provide access to certain information (e.g., operational task resources 804) during validation operations 168. The server 102 may execute the ML algorithms 160 to dynamically select and provide access to operational tasks 146 for a specific reviewing entity 172. Different reviewing entities 172 in an organization may be associated with different ranks and access to organization resources based on corresponding roles at the organization and/or subject-matter expertise. In this regard, the server 102 may be configured to dynamically assign operational tasks 146 generated by the ML algorithms 160 to specific reviewing entities 172 in accordance with one or more conditions. These conditions may include availability of a given reviewing entity 172, length of a role associated with a given reviewing entity 172, rank in the organization, expertise in a subject matter associated with a given reviewing entity 172, and historical feedback received from reviewing entities 172 among others. The operational tasks 146 may not be assigned to reviewing entities 172 and/or evaluation groups 170 that are not available to perform operational tasks 146. Further, specific operational tasks 146 may be performed by a managing reviewing entity 172 configured to review preliminary review feedback 142 from other reviewing entities 172. Upon assignment, the ML algorithm 160 may provide access to resources 804 relevant to performing the assigned operational task 146. These resources 804 may be network resources associated with a certification process.

In FIG. 8, the operation flow 800 shows one or more operations performed as part of selectively assigning access to network resources as part of an architecture roadmap 105a. The architecture roadmap 105a comprises a timeline 144a comprising a time period 802a and a time period 802b (collectively, time periods 802) among others, one or more status updates 154 (shown as status update 154a and status update 154b among others), and one or more validation operations 168a configured to assign multiple operational tasks 146 to multiple evaluation groups 170 based on information relating to one or more communication device types 107, one or more reviewing parameters 174, and one or more priority orders 176.

The architecture roadmap 105 shows an evaluation group 170a receiving access to operational task resources 804a to perform one or more operational tasks 146a, an evaluation group 170b receiving access to operational task resources 804b to perform one or more operational tasks 146b, and an evaluation group 170c receiving access to operational task resources 804c to perform one or more operational tasks 146c. The operational task resources 804a-804c (collectively, operational task resources 804) may be at least partially different to one another. The operational task resources 804*a* may be information and/or resources capabilities configured to enable the evaluation group 170*a* to perform the operational tasks 146*a*, the evaluation group 170*b* to perform the operational tasks 146*b*, and the evaluation group 170*c* to perform the operational tasks 146*c*. While FIG. 8 shows the evaluation groups 170*a*-170*c*, the architecture roadmap 105*a* may comprise less or more evaluation groups 170 than those shown. The operational tasks 146*a*-146*c* may be configured to evaluate one or more performance aspects 106 of the communication device type 107.

As a non-limiting example, the evaluation group 170*a* comprises reviewing entities 172*a*-172*d*, the evaluation group 170*b* comprises reviewing entities 172*e*-172*h*, and the evaluation group 170*c* comprises reviewing entities 172*i*-172*l*. At least some of the reviewing entities 172*a*-172*l* may be similar and/or different to one another. The reviewing entity 172*a*, the reviewing entity 172*b*, the reviewing entity 172*c*, the reviewing entity 172*d*, the reviewing entity 172*e*, the reviewing entity 172*f*, the reviewing entity 172*g*, the reviewing entity 172*h*, the reviewing entity 172*i*, the reviewing entity 172*j*, the reviewing entity 172*k*, the reviewing entity 172*l* may be configured to perform at least some of the same operational tasks 146. Each of the reviewing entities 172*a*-172*l* may comprise corresponding reviewing capabilities 174*a*-174*l*. As a non-limiting example, the reviewing parameters 174 for each reviewing entity 172 may comprise a corresponding experience level 810, a corresponding availability 812, and one or more corresponding device roles 814. In the example of FIG. 8, the reviewing entity 172*a* comprises an experience level 810*a*, an availability 812*a*, and one or more device roles 814*a*, the reviewing entity 172*b* comprises an experience level 810*b*, an availability 812*b*, and one or more device roles 814*b*, the reviewing entity 172*c* comprises an experience level 810*c*, an availability 812*c*, and one or more device roles 814*c*, and the reviewing entity 172*d* comprises an experience level 810*d*, an availability 812*d*, and one or more device roles 814*d*.

The experience level 810 for a given reviewing entity 172 may indicate whether the given reviewing entity 172 comprises a specific certification, previous experience performing one or more specific operational tasks 146, and/or whether the given reviewing entity 172 is configured to perform a certain number of the operational tasks 146*a*. The availability 812 for a given reviewing entity 172 may indicate whether the given reviewing entity 172 is available to perform a number of the operational tasks 146 in a predefined time period 802. The one or more device roles 814 for a given reviewing entity 172 may indicate whether the given reviewing entity 172 comprises one or more capabilities to use the operational task resources 804. The operational task resources 804 may be network resources comprising power resources, memory resources and/or processing resources among others.

In one or more embodiments, the server 102 may be configured to execute the ML algorithm 160 to generate the architecture roadmap 105*a* to perform the one or more validation operations 168*a* over the timeline 144*a*. The architecture roadmap 105*a* may comprise the operational tasks 146*a*-146*c* to be performed over the timeline 144*a*. In the process of implementing the architecture roadmap 105*a*, the server 102 may be configured to assign the operational tasks 146*a* to the reviewing entities 172*a*-172*d* in the evaluation group 170*a*, the operational tasks 146*b* to the reviewing entities 172*e*-172*h* in the evaluation group 170*b*, and the operational tasks 146*c* to the reviewing entities

172*i*-172*l* in the evaluation group 170*c*. The timeline 144*a* may indicate corresponding time periods 802 for each of the operational tasks 146*a*-146*c* assigned to the evaluation groups 170*a*-170*c*. The evaluation groups 170*a*-170*c* may be configured to provide status updates 154 to the server 102. Further, the operational tasks 146*a*-146*c* may be performed in accordance with one or more corresponding priority orders 176. The individual operational tasks 146 may be assigned a corresponding priority order 176. In some embodiments, the operational tasks 146*a* may comprise a first priority order 176*a*, the operational tasks 146*b* may comprise a first priority order 176*b*, and the operational tasks 146*c* may comprise a first priority order 176*c*.

Example Process to Provide Selective Access to Information During Validation Operations FIG. 9 illustrates an example flowchart of a process 900 configured to provide selective access to information during validation operations 820, in accordance with one or more embodiments. In one or more embodiments, the process 900 comprises operations 902-922. Modifications, additions, or omissions may be made to the process 900. The process 900 may include more, fewer, or other operations than those shown below. For example, operations may be performed in parallel or in any suitable order. While at times discussed as the server 102, one or more of the user equipment 112, components of any of thereof, or any suitable system or components of the communication system 100 may perform one or more operations of the process 900. For example, one or more operations of the process 900 may be implemented, at least in part, in the form of server instructions 132 of FIG. 1, stored on non-transitory computer readable media, tangible media, machine-readable media (e.g., server memory 130 of FIG. 1 operating as a non-transitory computer readable medium) that when run by one or more processors (e.g., the server processor 120 of FIG. 1) may cause the one or more processors to perform operations described in operations 902-922 of the process 900. The process 900 may be performed during a maintenance window or outside a maintenance window.

The process 900 starts at operation 902, where the server 102 is configured to receive an architecture roadmap 105 comprising operational tasks 146 configured to evaluate one or more performance aspects 106 of a communication device type 107. At operation 904, the server 102 is configured to determine reviewing requirements based on the operational tasks 146 and the communication device type 107. At operation 906, the server 102 is configured to determine at least one reviewing entity profile 171 (e.g., associated with a given reviewing entity 172) comprising one or more reviewing parameters 174 that match at least one reviewing requirement associated with a reviewing entity profile 171. At operation 908, the server 102 is configured to determine a reviewing entity 172 associated with the reviewing entity profile 171.

The process 900 continues to operation 910, where the server 102 is configured to determine whether there is a reviewing entity 172 associated with the reviewing entity profile 171. If the server 102 determines that there is at least one reviewing entity 172 associated with the reviewing entity profile 171 (i.e., YES), the process 900 proceeds to operation 912, operation 914, and operation 916. If the server 102 determines there are no reviewing entities 172 associated with the reviewing entity profile 171 (i.e., NO), the process 900 proceeds to operation 922.

The process 900 may conclude at operation 912, operation 914, and operation 916. At operation 912, the server 102 is configured to assign the operational tasks 146 to the reviewing entity 172. At operation 914, the server 102 is configured to generate one or more access commands 148 configured to facilitate access to one or more resources 804. At operation 916, the server 102 is configured to transmit the one or more access commands 148 to the reviewing entity 172.

The process 900 may conclude at operation 922. At operation 922, the server 102 is configured to terminate the architecture roadmap 105.

In one or more embodiments, the process 900 comprises a streamlined approach to provide selective access to operational task resources 804 during validation operations 168. In some embodiments, the process 900 may be configured to provide updates to users internally (e.g., to other servers 102 and/or user equipment 112 in the communication network) and/or externally (e.g., to OEMs) in the form of reports. These reports may comprise messages, notification alerts, and/or status updates 154 indicating that a change occurred in the process 900.

SCOPE OF THE DISCLOSURE

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus, comprising:
   a memory operable to store:
      a machine learning algorithm configured to analyze and structure data in accordance with one or more machine learning models; and
      one or more reviewing entity profiles, each reviewing entity profile of the one or more reviewing entity profiles being associated with one or more reviewing parameters; and
   a processor communicatively coupled to the memory and configured to:
      receive a first architecture roadmap comprising a first plurality of operational tasks configured to evaluate a first performance aspect of a communication device type, the first architecture roadmap being a first plan to perform the first plurality of operational tasks over a first time period;
      in response to receiving the first architecture roadmap comprising the first plurality of operational tasks, execute the machine learning algorithm to:
         evaluate the first plurality of operational tasks associated with the first architecture roadmap in accordance with the one or more machine learning models;
         in response to evaluating the first plurality of operational tasks, determine a first plurality of reviewing guidelines based on the first plurality of operational tasks and the communication device type, each of the first plurality of reviewing guidelines comprising instructions for performing one or more of the first plurality of operational tasks configured to evaluate the first performance aspect of the communication device type;
         determine a first reviewing entity profile of the one or more reviewing entity profiles comprising a first reviewing parameter that at least partially match a reviewing guideline of the first plurality of reviewing guidelines;
         determine a first reviewing entity associated with the first reviewing entity profile; and
         assign the first plurality of operational tasks to the first reviewing entity, the first reviewing entity being configured to perform the first plurality of operational tasks over the first time period;
      generate a first plurality of access commands configured to facilitate access to a first plurality of resources, the first plurality of resources allowing the first plurality of operational tasks to be evaluated by the first reviewing entity; and
      transmit the first plurality of access commands to the first reviewing entity.

2. The apparatus of claim 1, wherein the processor is further configured to:
   receive a second architecture roadmap comprising a second plurality of operational tasks configured to evaluate a second performance aspect of the communication device type, the second architecture roadmap being a second plan to perform the second plurality of operational tasks over a second time period;
   in response to receiving the second architecture roadmap comprising the second plurality of operational tasks, execute the machine learning algorithm to:
      evaluate the second plurality of operational tasks associated with the second architecture roadmap in accordance with the one or more machine learning models;
      in response to executing the machine learning algorithm, determine a second plurality of reviewing guidelines based on the second plurality of operational tasks and the communication device type, each of the second plurality of reviewing guidelines comprising instructions for performing one or more of the second plurality of operational tasks configured to evaluate the second performance aspect of the communication device type;
   determine a second reviewing entity profile of the one or more reviewing entity profiles comprising a second reviewing parameter that at least partially match a reviewing guideline of the second plurality of reviewing guidelines;
   determine a second reviewing entity associated with the second reviewing entity profile; and assign the second plurality of operational tasks to the second reviewing entity, the second reviewing entity being configured to perform the second plurality of operational tasks over the second time period;

generate a second plurality of access commands configured to facilitate access to a second plurality of resources, the second plurality of resources allowing the second plurality of operational tasks to be evaluated by the second reviewing entity; and transmit the second plurality of access commands to the second reviewing entity.

3. The apparatus of claim 2, wherein:

the reviewing guideline of the second plurality of reviewing guidelines comprises an instruction to perform a first operational task of the second plurality of operational tasks;

the instruction indicates an experience level in a knowledge area associated with the first operational task; and the second reviewing parameter indicating that the second reviewing entity comprises the experience level in the knowledge area associated with the first operational task of the second plurality of operational tasks.

4. The apparatus of claim 2, wherein:

the reviewing guideline of the second plurality of reviewing guidelines comprises an instruction to perform a first operational task of the second plurality of operational tasks;

the instruction indicates a requirement to perform the first operational task within the second time period; and the second reviewing parameter indicates that the second reviewing entity meets the requirement.

5. The apparatus of claim 1, wherein the processor is further configured to:

receive a second architecture roadmap comprising a second plurality of operational tasks configured to evaluate a second performance aspect of the communication device type, the second architecture roadmap being a second plan to perform the second plurality of operational tasks over a second time period;

in response to receiving the second architecture roadmap comprising the second plurality of operational tasks, execute the machine learning algorithm to:

evaluate the second plurality of operational tasks associated with the second architecture roadmap in accordance with the one or more machine learning models;

in response to executing the machine learning algorithm, determine a second plurality of reviewing guidelines based on the second plurality of operational tasks and the communication device type, each of the second plurality of reviewing guidelines comprising instructions for performing one or more of the second plurality of operational tasks configured to evaluate the second performance aspect of the communication device type;

determine a second reviewing entity profile of the one or more reviewing entity profiles comprising a second reviewing parameter that at least partially match a first reviewing guideline of the second plurality of reviewing guidelines;

determine a second reviewing entity associated with the second reviewing entity profile; and assign a first operational task of the second plurality of operational tasks to the second reviewing entity, the second reviewing entity being configured to perform the first operational task of the second plurality of operational tasks over the second time period;

generate a second plurality of access commands configured to facilitate access to a second plurality of resources, the second plurality of resources allowing the second plurality of operational tasks to be evaluated by the second reviewing entity;

transmit the second plurality of access commands to the second reviewing entity;

in response to transmitting the second plurality of access commands to the second reviewing entity, execute the machine learning algorithm to:

determine a third reviewing entity profile of the one or more reviewing entity profiles comprising a third reviewing parameter that at least partially match a second reviewing guideline of the second plurality of reviewing guidelines;

determine a third reviewing entity associated with the third reviewing entity profile; and assign a second operational task of the second plurality of operational tasks to the third reviewing entity, the third reviewing entity being configured to perform the second operational task of the second plurality of operational tasks over the second time period;

generate a third plurality of access commands configured to facilitate access to a third plurality of resources, the third plurality of resources allowing the second plurality of operational tasks to be evaluated by the third reviewing entity; and transmit the third plurality of access commands to the third reviewing entity.

6. The apparatus of claim 1, wherein the processor is further configured to:

receive a second architecture roadmap comprising a second plurality of operational tasks configured to evaluate a second performance aspect of the communication device type, the second architecture roadmap being a second plan to perform the second plurality of operational tasks over a second time period;

in response to receiving the second architecture roadmap comprising the second plurality of operational tasks, execute the machine learning algorithm to:

evaluate the second plurality of operational tasks associated with the second architecture roadmap in accordance with the one or more machine learning models;

in response to executing the machine learning algorithm, determine a second plurality of reviewing guidelines based on the second plurality of operational tasks and the communication device type, each of the second plurality of reviewing guidelines comprising instructions for performing one or more of the second plurality of operational tasks configured to evaluate the second performance aspect of the communication device type;

determine a second reviewing entity profile of the one or more reviewing entity profiles comprising a second reviewing parameter that at least partially match a first reviewing guideline of the second plurality of reviewing guidelines;

determine a second reviewing entity associated with the second reviewing entity profile; and assign a first operational task of the second plurality of operational tasks to the second reviewing entity, the second reviewing entity being configured to perform the first operational task of the second plurality of operational tasks over a first portion of the second time period;

generate a second plurality of access commands config-
ured to facilitate access to a second plurality of
resources, the second plurality of resources allowing
the second plurality of operational tasks to be evaluated
by the second reviewing entity;
transmit the second plurality of access commands to the
second reviewing entity;
receive a status update from the second reviewing entity,
the status update indicating that the second reviewing
entity completed the first operational task of the second
plurality of operational tasks within the first portion of
the second time period;
in response to receiving the status update, execute the
machine learning algorithm to:
determine a third reviewing entity profile of the one or
more reviewing entity profiles comprising a third
reviewing parameter that at least partially match a
second reviewing guideline of the second plurality of
reviewing guidelines;
determine a third reviewing entity associated with the
third reviewing entity profile; and
assign a second operational task of the second plurality
of operational tasks to the third reviewing entity, the
third reviewing entity being configured to perform
the second operational task of the second plurality of
operational tasks over a second portion of the second
time period;
generate a third plurality of access commands configured
to facilitate access to a third plurality of resources, the
third plurality of resources allowing the second plurality of operational tasks to be evaluated by the third
reviewing entity; and
transmit the third plurality of access commands to the
third reviewing entity.
7. The apparatus of claim 6, wherein the second plurality
of access commands configured to facilitate access to the
second plurality of resources are at least partially different to
the third plurality of access commands configured to facili-
tate access to the third plurality of resources.
8. A method, comprising:
receiving a first architecture roadmap comprising a first
plurality of operational tasks configured to evaluate a
first performance aspect of a communication device
type, the first architecture roadmap being a first plan to
perform the first plurality of operational tasks over a
first time period;
in response to receiving the first architecture roadmap
comprising the first plurality of operational tasks,
executing a machine learning algorithm to perform one
or more operations comprising:
evaluating the first plurality of operational tasks asso-
ciated with the first architecture roadmap in accor-
dance with one or more machine learning models;
in response to evaluating the first plurality of opera-
tional tasks, determining a first plurality of reviewing
guidelines based on the first plurality of operational
tasks and the communication device type, each of the
first plurality of reviewing guidelines comprising
instructions for performing one or more of the first
plurality of operational tasks configured to evaluate
the first performance aspect of the communication
device type;
determining a first reviewing entity profile of one or
more reviewing entity profiles comprising a first
reviewing parameter that at least partially match a
reviewing guideline of the first plurality of reviewing
guidelines;

determining a first reviewing entity associated with the
first reviewing entity profile; and
assigning the first plurality of operational tasks to the
first reviewing entity, the first reviewing entity being
configured to perform the first plurality of opera-
tional tasks over the first time period;
generating a first plurality of access commands configured
to facilitate access to a first plurality of resources, the
first plurality of resources allowing the first plurality of
operational tasks to be evaluated by the first reviewing
entity; and
transmitting the first plurality of access commands to the
first reviewing entity.
9. The method of claim 8, further comprising:
receiving a second architecture roadmap comprising a
second plurality of operational tasks configured to
evaluate a second performance aspect of the commu-
nication device type, the second architecture roadmap
being a second plan to perform the second plurality of
operational tasks over a second time period;
in response to receiving the second architecture roadmap
comprising the second plurality of operational tasks,
executing the machine learning algorithm to perform
one or more additional operations comprising:
evaluating the second plurality of operational tasks
associated with the second architecture roadmap in
accordance with the one or more machine learning
models;
in response to executing the machine learning algo-
rithm, determining a second plurality of reviewing
guidelines based on the second plurality of opera-
tional tasks and the communication device type, each
of the second plurality of reviewing guidelines com-
prising instructions for performing one or more of
the second plurality of operational tasks configured
to evaluate the second performance aspect of the
communication device type;
determining a second reviewing entity profile of the
one or more reviewing entity profiles comprising a
second reviewing parameter that at least partially
match a reviewing guideline of the second plurality
of reviewing guidelines;
determining a second reviewing entity associated with
the second reviewing entity profile; and
assigning the second plurality of operational tasks to
the second reviewing entity, the second reviewing
entity being configured to perform the second plu-
rality of operational tasks over the second time
period;
generating a second plurality of access commands con-
figured to facilitate access to a second plurality of
resources, the second plurality of resources allowing
the second plurality of operational tasks to be evaluated
by the second reviewing entity; and
transmitting the second plurality of access commands to
the second reviewing entity.
10. The method of claim 9, wherein:
the reviewing guideline of the second plurality of review-
ing guidelines comprises an instruction to perform a
first operational task of the second plurality of opera-
tional tasks;
the instruction indicates an experience level in a knowl-
edge area associated with the first operational task; and
the second reviewing parameter indicating that the second
reviewing entity comprises the experience level in the
knowledge area associated with the first operational
task of the second plurality of operational tasks.

11. The method of claim 9, wherein:

the reviewing guideline of the second plurality of reviewing guidelines comprises an instruction to perform a first operational task of the second plurality of operational tasks;

the instruction indicates a requirement to perform the first operational task within the second time period; and the second reviewing parameter indicates that the second reviewing entity meets the requirement.

12. The method of claim 8, further comprising:

receiving a second architecture roadmap comprising a second plurality of operational tasks configured to evaluate a second performance aspect of the communication device type, the second architecture roadmap being a second plan to perform the second plurality of operational tasks over a second time period;

in response to receiving the second architecture roadmap comprising the second plurality of operational tasks, executing the machine learning algorithm to perform one or more first additional operations comprising:

evaluating the second plurality of operational tasks associated with the second architecture roadmap in accordance with the one or more machine learning models;

in response to executing the machine learning algorithm, determining a second plurality of reviewing guidelines based on the second plurality of operational tasks and the communication device type, each of the second plurality of reviewing guidelines comprising instructions for performing one or more of the second plurality of operational tasks configured to evaluate the second performance aspect of the communication device type;

determining a second reviewing entity profile of the one or more reviewing entity profiles comprising a second reviewing parameter that at least partially match a first reviewing guideline of the second plurality of reviewing guidelines;

determining a second reviewing entity associated with the second reviewing entity profile; and assigning a first operational task of the second plurality of operational tasks to the second reviewing entity, the second reviewing entity being configured to perform the first operational task of the second plurality of operational tasks over the second time period;

generating a second plurality of access commands configured to facilitate access to a second plurality of resources, the second plurality of resources allowing the second plurality of operational tasks to be evaluated by the second reviewing entity;

transmitting the second plurality of access commands to the second reviewing entity;

in response to transmitting the second plurality of access commands to the second reviewing entity, executing the machine learning algorithm to perform one or more second additional operations comprising:

determining a third reviewing entity profile of the one or more reviewing entity profiles comprising a third reviewing parameter that at least partially match a second reviewing guideline of the second plurality of reviewing guidelines;

determining a third reviewing entity associated with the third reviewing entity profile; and assigning a second operational task of the second plurality of operational tasks to the third reviewing entity, the third reviewing entity being configured to perform the second operational task of the second plurality of operational tasks over the second time period;

generating a third plurality of access commands configured to facilitate access to a third plurality of resources, the third plurality of resources allowing the second plurality of operational tasks to be evaluated by the third reviewing entity; and transmitting the third plurality of access commands to the third reviewing entity.

13. The method of claim 8, further comprising:

receiving a second architecture roadmap comprising a second plurality of operational tasks configured to evaluate a second performance aspect of the communication device type, the second architecture roadmap being a second plan to perform the second plurality of operational tasks over a second time period;

in response to receiving the second architecture roadmap comprising the second plurality of operational tasks, executing the machine learning algorithm to perform one or more first additional operations comprising:

evaluating the second plurality of operational tasks associated with the second architecture roadmap in accordance with the one or more machine learning models;

in response to executing the machine learning algorithm, determining a second plurality of reviewing guidelines based on the second plurality of operational tasks and the communication device type, each of the second plurality of reviewing guidelines comprising instructions for performing one or more of the second plurality of operational tasks configured to evaluate the second performance aspect of the communication device type;

determining a second reviewing entity profile of the one or more reviewing entity profiles comprising a second reviewing parameter that at least partially match a first reviewing guideline of the second plurality of reviewing guidelines;

determining a second reviewing entity associated with the second reviewing entity profile; and assigning a first operational task of the second plurality of operational tasks to the second reviewing entity, the second reviewing entity being configured to perform the first operational task of the second plurality of operational tasks over a first portion of the second time period;

generating a second plurality of access commands configured to facilitate access to a second plurality of resources, the second plurality of resources allowing the second plurality of operational tasks to be evaluated by the second reviewing entity;

transmitting the second plurality of access commands to the second reviewing entity;

receiving a status update from the second reviewing entity, the status update indicating that the second reviewing entity completed the first operational task of the second plurality of operational tasks within the first portion of the second time period;

in response to receiving the status update, executing the machine learning algorithm to perform one or more second additional operations comprising:

determining a third reviewing entity profile of the one or more reviewing entity profiles comprising a third reviewing parameter that at least partially match a second reviewing guideline of the second plurality of reviewing guidelines;

determining a third reviewing entity associated with the third reviewing entity profile; and assigning a second operational task of the second plurality of operational tasks to the third reviewing entity, the third reviewing entity being configured to perform the second operational task of the second plurality of operational tasks over a second portion of the second time period;

generating a third plurality of access commands configured to facilitate access to a third plurality of resources, the third plurality of resources allowing the second plurality of operational tasks to be evaluated by the third reviewing entity; and transmitting the third plurality of access commands to the third reviewing entity.

14. The method of claim 13, wherein the second plurality of access commands configured to facilitate access to the second plurality of resources are at least partially different to the third plurality of access commands configured to facilitate access to the third plurality of resources.

15. A non-transitory computer-readable medium storing instructions that when executed by a processor cause the processor to:

receive a first architecture roadmap comprising a first plurality of operational tasks configured to evaluate a first performance aspect of a communication device type, the first architecture roadmap being a first plan to perform the first plurality of operational tasks over a first time period;

in response to receiving the first architecture roadmap comprising the first plurality of operational tasks, execute a machine learning algorithm to:

evaluate the first plurality of operational tasks associated with the first architecture roadmap in accordance with one or more machine learning models;

in response to evaluating the first plurality of operational tasks, determine a first plurality of reviewing guidelines based on the first plurality of operational tasks and the communication device type, each of the first plurality of reviewing guidelines comprising instructions for performing one or more of the first plurality of operational tasks configured to evaluate the first performance aspect of the communication device type;

determine a first reviewing entity profile of one or more reviewing entity profiles comprising a first reviewing parameter that at least partially match a reviewing guideline of the first plurality of reviewing guidelines;

determine a first reviewing entity associated with the first reviewing entity profile; and assign the first plurality of operational tasks to the first reviewing entity, the first reviewing entity being configured to perform the first plurality of operational tasks over the first time period;

generate a first plurality of access commands configured to facilitate access to a first plurality of resources, the first plurality of resources allowing the first plurality of operational tasks to be evaluated by the first reviewing entity; and transmit the first plurality of access commands to the first reviewing entity.

16. The non-transitory computer-readable medium of claim 15, the processor being further caused to:

receive a second architecture roadmap comprising a second plurality of operational tasks configured to evaluate a second performance aspect of the communication device type, the second architecture roadmap being a second plan to perform the second plurality of operational tasks over a second time period;

in response to receiving the second architecture roadmap comprising the second plurality of operational tasks, execute the machine learning algorithm to:

evaluate the second plurality of operational tasks associated with the second architecture roadmap in accordance with the one or more machine learning models;

in response to executing the machine learning algorithm, determine a second plurality of reviewing guidelines based on the second plurality of operational tasks and the communication device type, each of the second plurality of reviewing guidelines comprising instructions for performing one or more of the second plurality of operational tasks configured to evaluate the second performance aspect of the communication device type;

determine a second reviewing entity profile of the one or more reviewing entity profiles comprising a second reviewing parameter that at least partially match a reviewing guideline of the second plurality of reviewing guidelines;

determine a second reviewing entity associated with the second reviewing entity profile; and assign the second plurality of operational tasks to the second reviewing entity, the second reviewing entity being configured to perform the second plurality of operational tasks over the second time period;

generate a second plurality of access commands configured to facilitate access to a second plurality of resources, the second plurality of resources allowing the second plurality of operational tasks to be evaluated by the second reviewing entity; and transmit the second plurality of access commands to the second reviewing entity.

17. The non-transitory computer-readable medium of claim 16, wherein:

the reviewing guideline of the second plurality of reviewing guidelines comprises an instruction to perform a first operational task of the second plurality of operational tasks;

the instruction indicates an experience level in a knowledge area associated with the first operational task; and the second reviewing parameter indicating that the second reviewing entity comprises the experience level in the knowledge area associated with the first operational task of the second plurality of operational tasks.

18. The non-transitory computer-readable medium of claim 16, wherein:

the reviewing guideline of the second plurality of reviewing guidelines comprises an instruction to perform a first operational task of the second plurality of operational tasks;

the instruction indicates a requirement to perform the first operational task within the second time period; and the second reviewing parameter indicates that the second reviewing entity meets the requirement.

19. The non-transitory computer-readable medium of claim 15, the processor being further caused to:

receive a second architecture roadmap comprising a second plurality of operational tasks configured to evaluate a second performance aspect of the communication device type, the second architecture roadmap being a second plan to perform the second plurality of operational tasks over a second time period;

in response to receiving the second architecture roadmap comprising the second plurality of operational tasks, execute the machine learning algorithm to:

evaluate the second plurality of operational tasks associated with the second architecture roadmap in accordance with the one or more machine learning models;

in response to executing the machine learning algorithm, determine a second plurality of reviewing guidelines based on the second plurality of operational tasks and the communication device type, each of the second plurality of reviewing guidelines comprising instructions for performing one or more of the second plurality of operational tasks configured to evaluate the second performance aspect of the communication device type;

determine a second reviewing entity profile of the one or more reviewing entity profiles comprising a second reviewing parameter that at least partially match a first reviewing guideline of the second plurality of reviewing guidelines;

determine a second reviewing entity associated with the second reviewing entity profile; and assign a first operational task of the second plurality of operational tasks to the second reviewing entity, the second reviewing entity being configured to perform the first operational task of the second plurality of operational tasks over the second time period;

generate a second plurality of access commands configured to facilitate access to a second plurality of resources, the second plurality of resources allowing the second plurality of operational tasks to be evaluated by the second reviewing entity;

transmit the second plurality of access commands to the second reviewing entity;

in response to transmitting the second plurality of access commands to the second reviewing entity, execute the machine learning algorithm to:

determine a third reviewing entity profile of the one or more reviewing entity profiles comprising a third reviewing parameter that at least partially match a second reviewing guideline of the second plurality of reviewing guidelines;

determine a third reviewing entity associated with the third reviewing entity profile; and assign a second operational task of the second plurality of operational tasks to the third reviewing entity, the third reviewing entity being configured to perform the second operational task of the second plurality of operational tasks over the second time period;

generate a third plurality of access commands configured to facilitate access to a third plurality of resources, the third plurality of resources allowing the second plurality of operational tasks to be evaluated by the third reviewing entity; and transmit the third plurality of access commands to the third reviewing entity.

20. The non-transitory computer-readable medium of claim 15, the processor being further caused to:

receive a second architecture roadmap comprising a second plurality of operational tasks configured to evaluate a second performance aspect of the communication device type, the second architecture roadmap being a second plan to perform the second plurality of operational tasks over a second time period;

in response to receiving the second architecture roadmap comprising the second plurality of operational tasks, execute the machine learning algorithm to:

evaluate the second plurality of operational tasks associated with the second architecture roadmap in accordance with the one or more machine learning models;

in response to executing the machine learning algorithm, determine a second plurality of reviewing guidelines based on the second plurality of operational tasks and the communication device type, each of the second plurality of reviewing guidelines comprising instructions for performing one or more of the second plurality of operational tasks configured to evaluate the second performance aspect of the communication device type;

determine a second reviewing entity profile of the one or more reviewing entity profiles comprising a second reviewing parameter that at least partially match a first reviewing guideline of the second plurality of reviewing guidelines;

determine a second reviewing entity associated with the second reviewing entity profile; and assign a first operational task of the second plurality of operational tasks to the second reviewing entity, the second reviewing entity being configured to perform the first operational task of the second plurality of operational tasks over a first portion of the second time period;

generate a second plurality of access commands configured to facilitate access to a second plurality of resources, the second plurality of resources allowing the second plurality of operational tasks to be evaluated by the second reviewing entity;

transmit the second plurality of access commands to the second reviewing entity;

receive a status update from the second reviewing entity, the status update indicating that the second reviewing entity completed the first operational task of the second plurality of operational tasks within the first portion of the second time period;

in response to receiving the status update, execute the machine learning algorithm to:

determine a third reviewing entity profile of the one or more reviewing entity profiles comprising a third reviewing parameter that at least partially match a second reviewing guideline of the second plurality of reviewing guidelines;

determine a third reviewing entity associated with the third reviewing entity profile; and assign a second operational task of the second plurality of operational tasks to the third reviewing entity, the third reviewing entity being configured to perform the second operational task of the second plurality of operational tasks over a second portion of the second time period;

generate a third plurality of access commands configured to facilitate access to a third plurality of resources, the third plurality of resources allowing the second plurality of operational tasks to be evaluated by the third reviewing entity; and transmit the third plurality of access commands to the third reviewing entity.

* * * * *